United States Patent [19]
Arita

[11] Patent Number: 5,956,532
[45] Date of Patent: *Sep. 21, 1999

[54] OPTICAL SYSTEM MOVING CONTROL APPARATUS FOR CAMERA

[75] Inventor: Hiroshi Arita, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,818

[22] Filed: Oct. 21, 1997

Related U.S. Application Data

[63] Continuation of application No. 08/279,599, Jul. 25, 1994, abandoned.

[30] Foreign Application Priority Data

Jul. 27, 1993 [JP] Japan ................................... 5-203720
Jul. 27, 1993 [JP] Japan ................................... 5-203721
Jul. 27, 1993 [JP] Japan ................................... 5-203726

[51] Int. Cl.$^6$ .................................................. G03B 17/00
[52] U.S. Cl. .............................................. 396/72; 396/87
[58] Field of Search ........................... 354/195.61, 195.2, 354/400, 286, 195.11; 396/72, 76, 85, 86, 87, 88, 135, 136

[56] References Cited

U.S. PATENT DOCUMENTS

| | | | |
|---|---|---|---|
| 4,312,579 | 1/1982 | Araki | 354/29 |
| 4,462,669 | 7/1984 | Suzuki | 354/400 |
| 4,472,040 | 9/1984 | Kawabata | 354/406 |
| 4,829,331 | 5/1989 | Aihara | 354/400 |
| 5,023,645 | 6/1991 | Yoshida et al. | 354/400 |
| 5,038,164 | 8/1991 | Harada | 354/400 |
| 5,124,737 | 6/1992 | Inoue et al. | 354/400 |
| 5,287,137 | 2/1994 | Hara et al. | 354/195.12 |
| 5,323,199 | 6/1994 | Yoshida | 354/195.1 |
| 5,570,149 | 10/1996 | Wakabayashi et al. | 396/85 |
| 5,572,270 | 11/1996 | Yamamoto et al. | 396/133 |
| 5,602,608 | 2/1997 | Asakura et al. | 396/85 |
| 5,614,972 | 3/1997 | Wakabayashi et al. | 396/135 |
| 5,628,035 | 5/1997 | Nakazawa | 396/87 |

*Primary Examiner*—Eddie C. Lee
*Assistant Examiner*—Christopher E. Mahoney
*Attorney, Agent, or Firm*—Robin, Blecker & Daley

[57] ABSTRACT

An optical apparatus includes a signal output device which outputs an analog signal corresponding to a position of an operation member and a determination device which determines the position of the operation member in accordance with at least first and second determinations. In the first determination, the determination device determines the position of the operation member during movement of the operation member by comparing the analog signal of the signal output device with a plurality of predetermined values. In the second determination, the determination device determines the position of the operation member after the operation member has stopped by using a manner different from a manner of the first determination.

31 Claims, 17 Drawing Sheets

| $V_{OUT}$ (V) | FOCAL LENGTH (mm) | ZOOM POSITION |
|---|---|---|
| 2.4 ~ 2.5 | 100 ~ 105 (T END) | 1 |
| 2.3 ~ | 94 ~ | 2 |
| 2.2 ~ | 86 ~ | 3 |
| 2.1 ~ | 79 ~ | 4 |
| 2.0 ~ | 72 ~ | 5 |
| 1.9 ~ | 66 ~ | 6 |
| 1.8 ~ | 60 ~ | 7 |
| 1.6 ~ | 56 ~ | 8 |
| 1.4 ~ | 51 ~ | 9 |
| 1.2 ~ | 47 ~ | 10 |
| 1.0 ~ | 43 ~ | 11 |
| 0.8 ~ | 39 ~ | 12 |
| 0 ~ | 35 ~ (W END) | 13 |

| $V_{OUT}$ (V) | FOCAL LENGTH (mm) | ZOOM POSITION |
|---|---|---|
| 2.4 ~ 2.5 | 100 ~ 105 (TELE END) | 1 |
| 2.3 ~ | 94 ~ | 2 |
| 2.2 ~ | 86 ~ | 3 |
| 2.1 ~ | 79 ~ | 4 |
| 2.0 ~ | 72 ~ | 5 |
| 1.9 ~ | 66 ~ | 6 |
| 1.8 ~ | 60 ~ | 7 |
| 1.6 ~ | 56 ~ | 8 |
| 1.4 ~ | 51 ~ | 9 |
| 1.2 ~ | 47 ~ | 10 |
| 1.0 ~ | 43 ~ | 11 |
| 0.8 ~ | 39 ~ | 12 |
| 0.6 ~ | 35 ~ (WIDE END) | 13 |
| 0.2 ~ | SUPER WIDE (PHOTO-TAKING INHIBITION POSITION) | 14 |
| 0 ~ | COLLAPSION END POSITION | 15 |

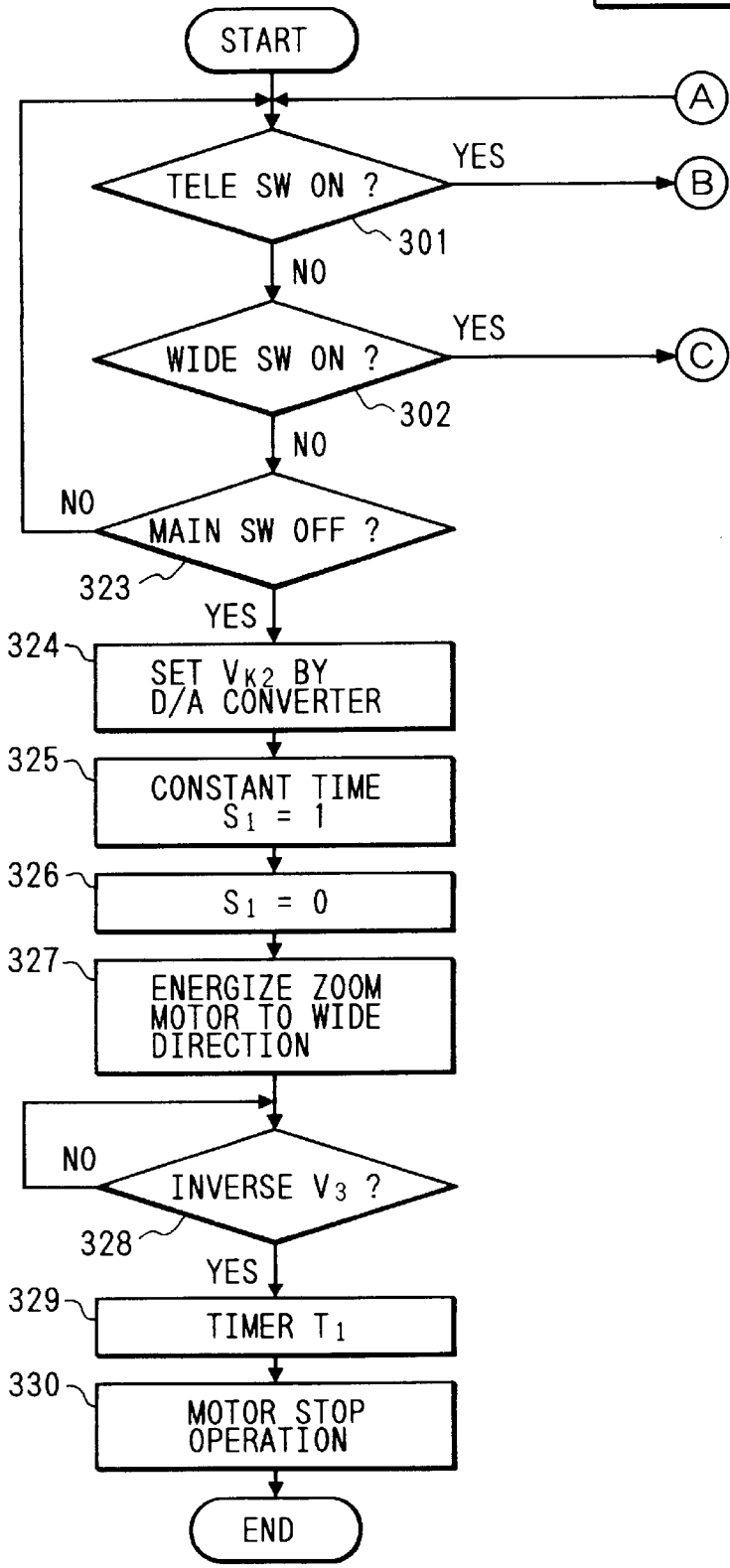

| FIG. 12A | FIG. 12B |

OPTICAL SYSTEM MOVING CONTROL APPARATUS FOR CAMERA

This is a continuation application under 37 CFR 1.62 of prior application of Ser. No. 08/279,599, filed Jul. 25, 1994, now abandoned.

BACKGROUND OF THE INVENTION

1. Field of the Invention

The present invention relates to an apparatus for controlling the moving position of an object and, more particularly, to an apparatus suited for control of the moving position of an optical system of a camera.

2. Related Background Art

In a lens-shutter type camera, if the focal length changes, the f-number and the lens extension amount upon focusing normally change accordingly. Therefore, focal length detection means is required to achieve f-number correction and lens extension amount correction.

As the most popular one of such focal length detection means, means for moving a brush on a code pattern of gray codes in synchronism with movement of the focal length is known. In addition, a method of detecting the focal length using a variable resistor whose output changes in synchronism with movement of the focal length is known. In terms of detection with high accuracy, this method is more effective than the above-mentioned means.

In the conventional focal length detection means using the variable resistor which can detect the focal length of a zoom lens with high precision, since the focal length is detected using an A/D converter during zooming, an accuracy error of the A/D converter occurs and focal length detection accuracy is impaired due to the influences of, e.g., a voltage drop upon energization to a zoom motor, noise of the motor, and the like. In addition, when one A/D conversion period is long, a stop error inevitably occurs due to a shift in detection time in correspondence with the period. As a result, the lens cannot be accurately stopped at a target zooming stop position [the TELE (telephoto side) end upon driving in the TELE direction or the WIDE (wide-angle side) end upon driving in the WIDE direction].

Furthermore, with the conventional means, since the linearity of the A/D converter suffers upon a voltage drop of a power supply voltage, if focal length detection is performed during charging of a stroboscope device, the detection cannot be normally performed.

SUMMARY OF THE INVENTION

One aspect of the present invention is to provide a camera, an apparatus, or a device applied thereto, which comprises first signal output means for outputting an analog signal corresponding to a moving position of an operation member, stop means for stopping the operation member in response to the analog signal from the first signal output means having reached a predetermined value, and second signal output means for outputting a signal corresponding to a position, in a stop state, of the operation member.

Another aspect of the present invention is to provide a camera, an apparatus, or a device applied thereto, which comprises signal output means for outputting an analog signal corresponding to a moving position of an operation member, and connection means for inhibiting an operation of the signal output means simultaneously with an operation of another load.

Other aspects of the present invention will become apparent from the following description of the preferred embodiments.

DETAILED DESCRIPTION OF THE PREFERRED EMBODIMENTS

The preferred embodiments of the present invention will be described hereinafter with reference to the accompanying drawings.

Figure 1:
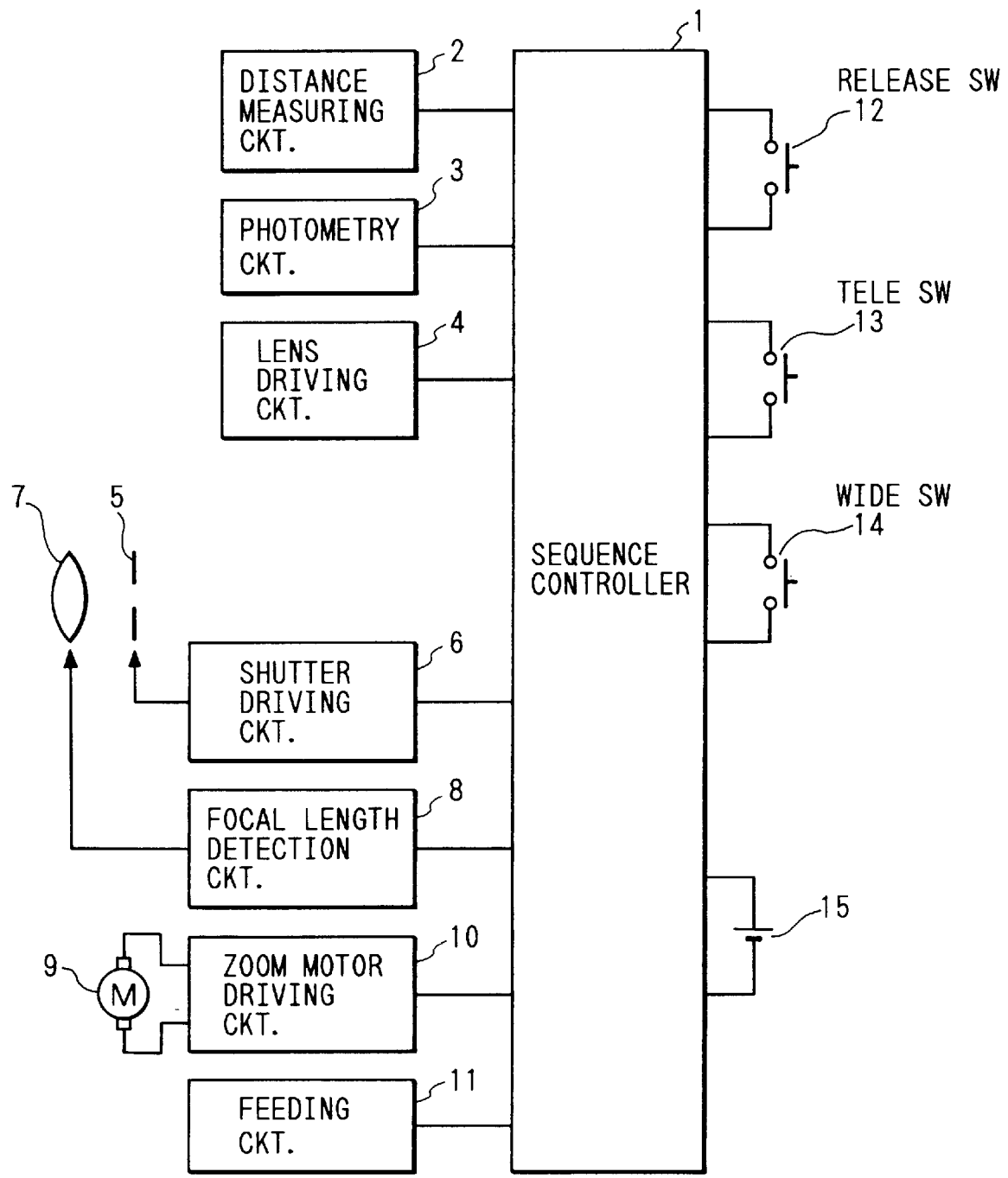
FIG. 1 is a block diagram showing the arrangement of principal part of a zoom camera according to the first embodiment of the present invention.

FIG. 1 is a block diagram showing the arrangement of principal part of a zoom camera according to the first embodiment of the present invention.

Referring to FIG. 1, the zoom camera comprises a sequence controller 1 for controlling the sequence of the entire camera, a distance measuring circuit 2 for measuring an object distance, a photometry circuit 3 for measuring the illuminance of an object, a lens driving circuit 4 for performing focusing upon reception of a lens driving amount, which is calculated on the basis of distance information measured by the distance measuring circuit 2, a shutter 5, a shutter driving circuit 6 for driving the shutter 5, and a photo-taking lens 7. The camera also comprises a focal length detection circuit 8 which uses a variable resistor (rheostat) to detect the focal length of the photo-taking lens 7, a zoom motor 9 for performing zooming, a zoom motor driving circuit 10 for driving the zoom motor 9, a feeding circuit 11 for feeding a film, a release switch 12, a TELE switch 13 for performing a zooming operation in the TELE direction, a WIDE switch 14 for performing a zooming operation in the WIDE direction, and a battery 15 serving as a power supply of the camera.

Figures 2, 3:
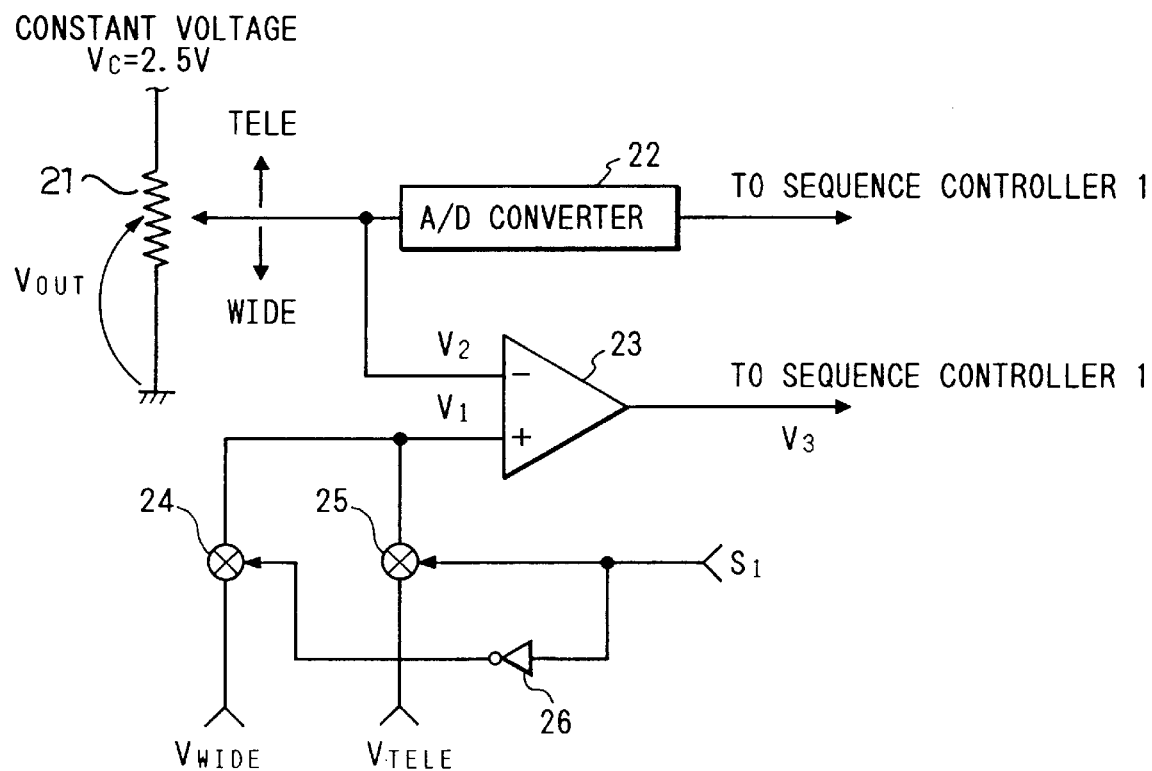
FIG. 2 is a circuit diagram showing the detailed arrangement of a focal length detection circuit shown in FIG. 1.
FIG. 3 is a table showing the relationship between the output level of the focal length detection circuit shown in FIG. 2 and the corresponding focal length.

FIG. 2 is a circuit diagram showing the arrangement of the focal length detection circuit 8.

Referring to FIG. 2, the focal length detection circuit 8 comprises a variable resistor 21 and an A/D converter 22. In the variable resistor 21, the two terminals of the resistor are respectively connected to a constant voltage $V_C$ (=2.5 V) and GND, and the movable segment moves in synchronism with the zooming operation. Upon zooming in the TELE direction, the movable segment moves toward the $V_C$ side; and upon zooming in the WIDE direction, the movable segment moves toward the GND side. The A/D converter 22 A/D-converts a potential $V_{OUT}$ at the movable segment of the variable resistor 21.

A digital output from the A/D converter 22 is input to the sequence controller for controlling various circuits of the camera, and thereafter, is classified into a plurality of zones to facilitate arithmetic processing.

FIG. 3 shows an example of the relationship between $V_{OUT}$ and the corresponding focal lengths when the number of zones is 13.

In this example, the camera has a focal length ranging from "35 mm to 105 mm", and divided zones are assigned in turn from the TELE end with numbers 1 to 13 called zoom positions (ZP).

Referring back to FIG. 2, a comparator 23 receives, at its non-inverting input terminal, an input $V_1$ as a reference voltage level, and at its inverting input terminal, the output $V_{OUT}$ from the variable resistor 21 as an input $V_2$. The comparator 23 outputs the comparison result of these inputs as an output $V_3$. An analog switch 24 is used for turning on/off the connection between the non-inverting input terminal of the comparator 23 and a constant voltage input $V_{WIDE}$ which has the same value as that of the output $V_{OUT}$ (0.8 V in FIG. 3) obtained when the zoom position is present at the boundary between "ZP=12" and "ZP=13 (WIDE end)". More specifically, the analog switch 24 is used for selecting whether or not the input $V_{WIDE}$ is applied as the input $V_1$. Similarly, an analog switch 25 is used for turning on/off the connection between the non-inverting input terminal of the comparator 23 and a constant voltage input $V_{TELE}$ which has the same value as that of the output $V_{OUT}$ (2.4 V in FIG. 3) obtained when the zoom position is present at the boundary between "ZP=1 (TELE end)" and "ZP=2". More specifically, the analog switch 25 is used for selecting whether or not the input $V_{TELE}$ is applied as the input $V_1$. An inverting gate (inverter) 26 is used for inverting a control signal $S_1$ from the sequence controller 1.

Figure 4:
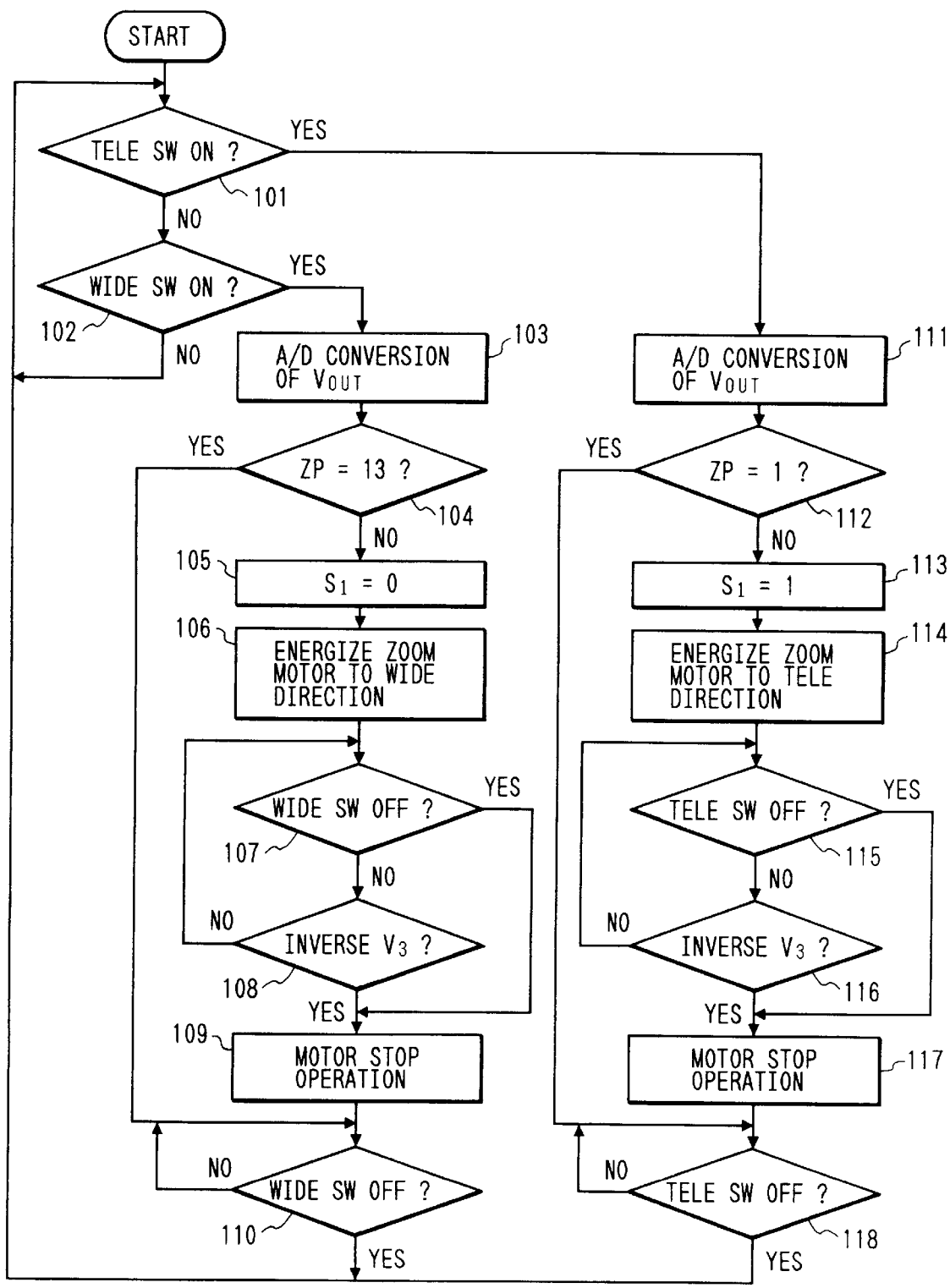
FIG. 4 is a flow chart showing the operation of the principal part portion of the zoom camera according to the first embodiment of the present invention.

The operation of (the sequence controller 1 of) the zoom camera with the above-mentioned arrangement will be described below with reference to the flow chart in FIG. 4. In an initial state, assume that the camera waits for the ON operation of the TELE switch 13 or the WIDE switch 14, i.e., repeats steps 101→102→101 . . . .

From this state, if it is determined in step 101 that the TELE switch 13 is ON, the flow advances from step 101 to step 111 to read the output from the A/D converter 22 for A/D-converting the output $V_{OUT}$ from the variable resistor 21, i.e., focal length information (zoom position) from the focal length detection circuit 8. In step 112, it is checked if the read zoom position is "ZP=1 (TELE end)". If YES in step 112, the flow jumps to step 118 to wait for the OFF operation of the TELE switch 13. When YES in step 118, the control returns to the initial state.

On the other hand, if NO in step 112, the flow advances from step 112 to step 113. In step 113, the control signal $S_1$=1 (meaning a high-level signal) is output to turn on the analog switch 25 (FIG. 2) and to turn off the analog switch 24 (FIG. 2), thereby setting $V_1$=$V_{TELE}$. In step 114, the zoom motor 9 is energized in the TELE direction via the zoom motor driving circuit 10, thereby moving the zoom lens in the photo-taking lens 7 in the TELE direction. In step 115, it is checked if the TELE switch 13 is OFF. If NO in step 115, the flow advances to step 116 to check if the output $V_3$ from the comparator 23 in the focal length detection circuit 8 is inverted from a state before the zoom motor is energized in the TELE direction. If NO in step 116, the flow returns to step 115 to repeat the above-mentioned operation.

Thereafter, if it is determined in step 115 that the TELE switch 13 is turned off or if it is determined in step 116 that the output $V_3$ from the comparator 23 is inverted from a state before the zoom motor is energized in the TELE direction, the flow advances to step 117 to start a stop operation of the zoom motor 9. In step 118, the control waits for the OFF operation of the TELE switch 13. When YES in step 118, the control returns to the initial state. The stop operation of the zoom motor 9 means a series of control operations for braking the motor by energizing it in the reverse direction or short-circuiting the motor for a predetermined period of time, and thereafter, disabling energization to the motor.

From the initial state, if it is determined in step 102 that the WIDE switch 14 is ON, the flow advances from step 102 to step 103 to read the output from the A/D converter 22 for A/D-converting the output $V_{OUT}$ from the variable resistor 21, i.e., the zoom position from the focal length detection circuit 8. It is then checked in step 104 if the read zoom position is "ZP=13 (WIDE end)". If YES in step 104, the flow jumps to step 110 to wait for the OFF operation of the WIDE switch 14. If YES in step 110, the control returns to the initial state.

On the other hand, if NO in step 104, the flow advances from step 104 to step 105. In step 105, the control signal $S_1$=0 (meaning a low-level signal) is output to turn on the analog switch 24 (FIG. 2) and to turn off the analog switch 25 (FIG. 2), thereby setting $V_1$=$V_{WIDE}$. In step 106, the zoom motor 9 is energized in the WIDE direction via the zoom motor driving circuit 10, thereby moving the zoom lens in the photo-taking lens 7 in the WIDE direction. It is then checked in step 107 if the WIDE switch 14 is OFF. If NO in step 107, the flow advances to step 108 to check if the output $V_3$ from the comparator 23 in the focal length detection circuit 8 is inverted from a state before the zoom motor is energized in the WIDE direction. If NO in step 108, the flow returns to step 107 to repeat the above-mentioned operation.

Thereafter, if it is determined in step 107 that the WIDE switch 14 is OFF or if it is determined in step 108 that the output $V_3$ from the comparator 23 is inverted from a state before the zoom motor is energized in the WIDE direction, the flow advances to step 109 to start the stop operation of the zoom motor 9. In step 110, the control waits for the OFF operation of the WIDE switch 14. If YES in step 110, the control returns to the initial state.

In the first embodiment, $V_{TELE}$ and $V_{WIDE}$ are fixed. If these levels are allowed to be set by a D/A converter, the levels $V_{TELE}$ and $V_{WIDE}$ can be adjusted, so that the stop positions at the TELE and WIDE ends upon zooming can be easily finely adjusted, or the stop positions can be easily intentionally shifted.

Since the circuit arrangement of the D/A converter is often basically the same as that of the A/D converter, if the analog output from the D/A converter is directly input to a comparator, the analog output is undesirably influenced by a voltage drop upon energization to the zoom motor, noise of the motor, and the like in the same manner as in the above-mentioned case of the A/D converter. Therefore, before the zoom motor is energized, the output from the D/A converter must be latched by, e.g., a capacitor.

Figure 5:
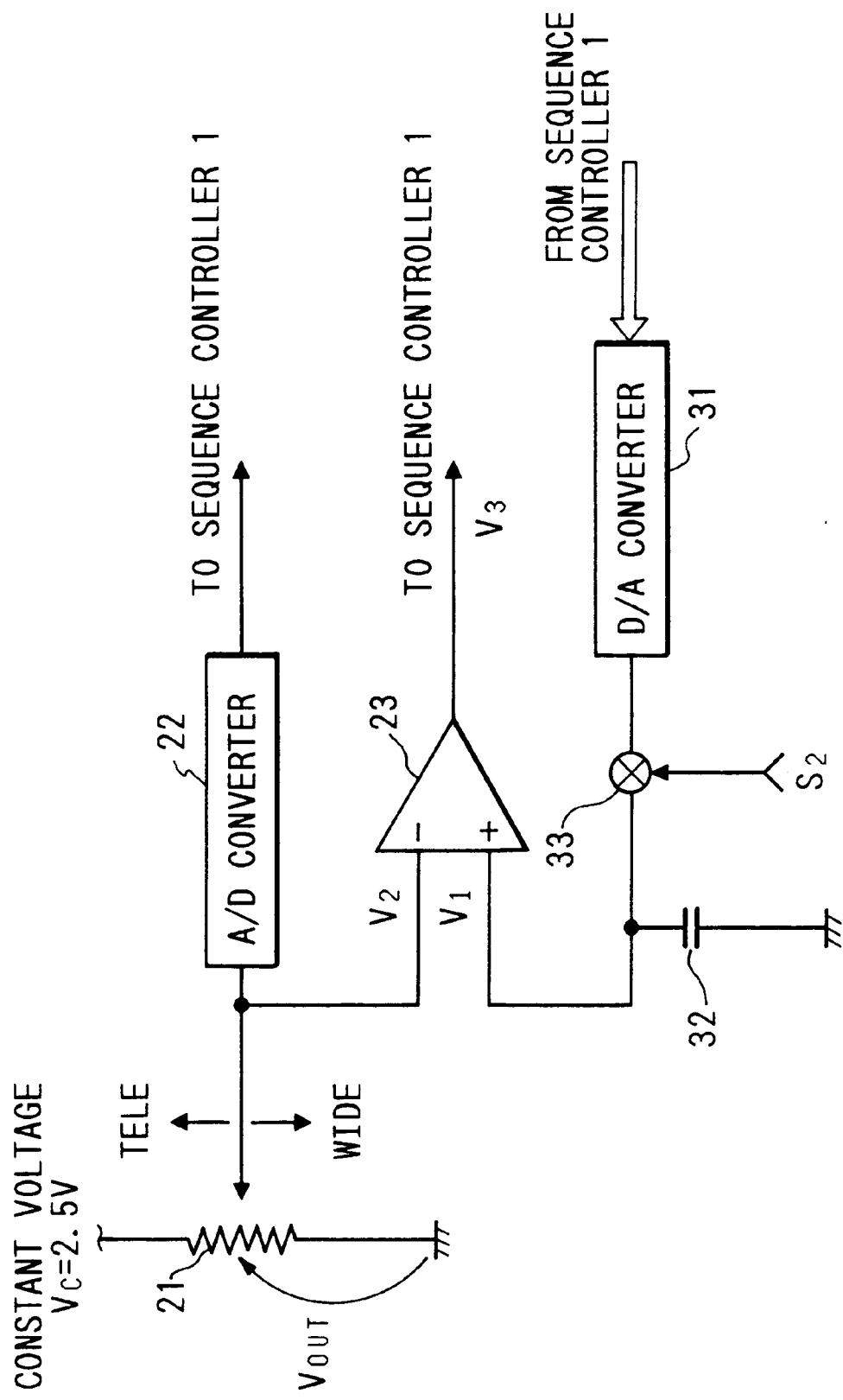
FIG. 5 is a circuit diagram showing the detailed arrangement of a focal length detection circuit of a zoom camera according to the second embodiment of the present invention.

FIG. 5 shows the arrangement of the focal length detection circuit according to the second embodiment of the present invention, which circuit adopts the above-mentioned arrangement. Since other circuit arrangements of the camera are the same as those in the first embodiment, they will be quoted in the following description.

Referring to FIG. 5, the focal length detection circuit comprises a D/A converter 31 for setting an analog output in accordance with a digital communication from the sequence controller 1, and a capacitor 32 for latching the analog output from the D/A converter 31. Also, the circuit comprises an analog switch 33 which is turned on/off in response to a control signal $S_2$ from the sequence controller 1. The analog switch 33 has a function of controlling the connection/non-connection state between the analog output from the D/A converter 31 and the capacitor 32.

Figure 6:
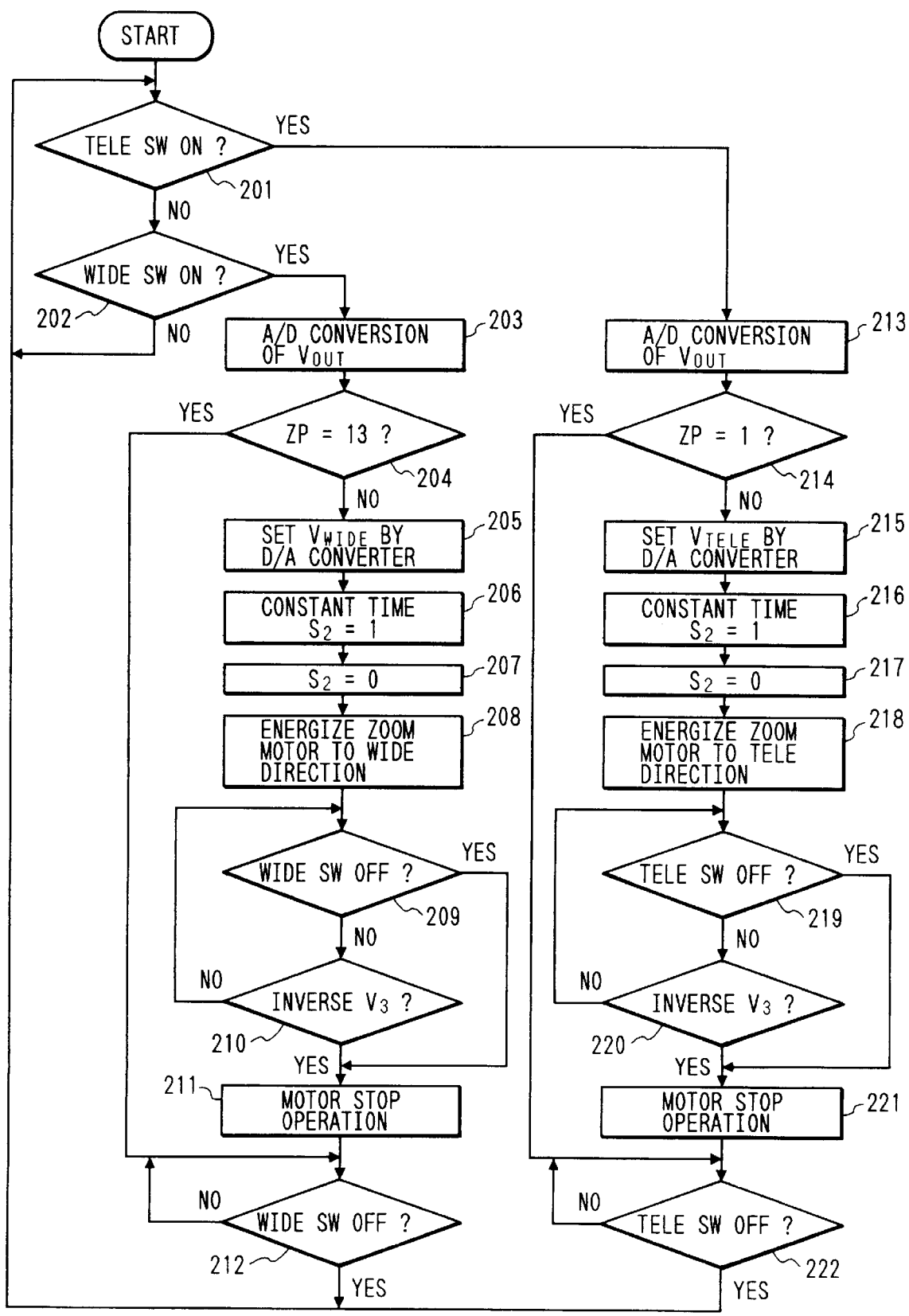
FIG. 6 is a flow chart showing the operation of the principal part portion of the zoom camera according to the second embodiment of the present invention.

The operation of a zoom camera comprising the focal length detection circuit with the above-mentioned arrangement will be described below with reference to the flow chart of the sequence controller 1 shown in FIG. 6. In an initial state, assume that the camera waits for the ON operation of TELE switch 13 or the WIDE switch 14, i.e., repeats steps 201→202→201 . . . .

From this state, if it is determined in step 201 that the TELE switch 13 is ON, the flow advances from step 201 to step 213 to read the output from the A/D converter 22 for A/D-converting the output $V_{OUT}$ from the variable resistor 21, i.e., the zoom position from the focal length detection circuit 8. In step 214, it is checked if the read zoom position is "ZP=1 (TELE end)". If YES in step 214, the flow jumps to step 222 to wait for the OFF operation of the TELE switch 13. When YES in step 222, the control returns to the initial state.

On the other hand, if NO in step 214, the flow advances from step 214 to step 215. The analog output $V_{TELE}$ is set by the D/A converter 31 in step 215, and the control signal $S_2=1$ is set for a constant time, which is long enough to latch the analog output $V_{TELE}$ in the capacitor 32 in step 216, thereby turning on the analog switch 33 in FIG. 5. If the constant time has elapsed, the flow advances to step 217 to set the control signal $S_2=0$, thus turning off the analog switch 33 in FIG. 5. The flow then advances to step 218, and the zoom motor 9 is energized in the TELE direction via the zoom motor driving circuit 10, thereby moving the zoom lens in the photo-taking lens 7 in the TELE direction. In step 219, it is checked if the TELE switch 13 is OFF. If NO in step 219, the flow advances to step 220 to check if the output $V_3$ from the comparator 23 in the focal length detection circuit 8 is inverted from a state before the zoom motor is energized in the TELE direction. If NO in step 220, the flow returns to step 219 to repeat the above-mentioned operation.

Thereafter, if it is determined in step 219 that the TELE switch 13 is turned off or if it is determined in step 220 that the output $V_3$ from the comparator 23 is inverted from a state before the zoom motor is energized in the TELE direction, the flow advances to step 221 to start the stop operation of the zoom motor 9. In step 222, the control waits for the OFF operation of the TELE switch 13. When YES in step 222, the control returns to the initial state.

From the initial state, if it is determined in step 202 that the WIDE switch 14 is ON, the flow advances from step 202 to step 203 to read the output from the A/D converter 22 for A/D-converting the output $V_{OUT}$ from the variable resistor 21, i.e., the zoom position from the focal length detection circuit 8. It is then checked in step 204 if the read zoom position is "ZP=13 (WIDE end)". If YES in step 204, the flow jumps to step 212 to wait for the OFF operation of the WIDE switch 14. When YES in step 212, the control returns to the initial state.

On the other hand, if NO in step 204, the flow advances from step 204 to step 205. The analog output $V_{WIDE}$ is set by the D/A converter 31 in step 205, and the control signal $S_2=1$ is set for a constant time, which is long enough to latch the analog output $V_{WIDE}$ in the capacitor 32 in step 206, thereby turning on the analog switch 33 in FIG. 5. If the constant time has elapsed, the flow advances to step 207 to set the control signal $S_2=0$, thus turning off the analog switch 33 in FIG. 5. The flow then advances to step 208, and the zoom motor 9 is energized in the WIDE direction via the zoom motor driving circuit 10, thereby moving the zoom lens in the photo-taking lens 7 in the WIDE direction. It is then checked in step 209 if the WIDE switch 14 is OFF. If NO in step 209, the flow advances to step 210 to check if the output $V_3$ from the comparator 23 in the focal length detection circuit 8 is inverted from a state before the zoom motor is energized in the WIDE direction. If NO in step 210, the flow returns to step 209 to repeat the above-mentioned operation.

Thereafter, if it is determined in step 209 that the WIDE switch 14 is OFF or if it is determined in step 210 that the output $V_3$ from the comparator 23 is inverted from a state before the zoom motor is energized in the WIDE direction, the flow advances to step 211 to start the stop operation of the zoom motor 9. In step 212, the control waits for the OFF operation of the WIDE switch 14. If YES in step 212, the control returns to the initial state.

According to each of the above-mentioned embodiments, focal length detection using the A/D converter is not performed during zooming, and the comparator compares the constant voltage level corresponding to the voltage level of the variable resistor at the zooming stop target position with the actual voltage level of the variable resistor. If the comparator output is inverted, it is determined that the zooming stop target position has been reached, and the zooming stop operation is started. For this reason, accurate focal length information can be obtained, and the zoom lens can be accurately and stably moved to the target stop position.

More specifically, according to each of the first and second embodiments described above, the camera comprises focal length signal extraction means for, when zooming is not performed, reading out a focal length signal from an A/D converter in focal length detection means, and zooming control means for, when the output from a comparator in the focal length detection means is inverted during zooming from a state before the beginning of zooming, determining that the zooming stop target position has been reached, and starting a zooming stop operation. Since there is a fear of causing an accuracy error of the A/D converter in the focal length detection means during zooming, the focal length information is extracted only when zooming is not performed. When the zoom lens is moved to the zooming stop target position, the output from the A/D converter is not used, and a constant voltage corresponding to the output voltage level from the variable resistor at the zooming stop target position is used as a reference voltage. When the output from the comparator for comparing the reference voltage with the output voltage from the variable resistor corresponding to the actual zoom lens position is inverted from the state before beginning of zooming, it is determined that the zooming stop target position has been reached, and the zooming stop operation is started.

Therefore, accurate focal length information can be obtained, and the zoom lens can be accurately moved to the target stop position.

According to the second embodiment, since the reference level to be compared with the voltage level from the variable resistor at the zooming stop target position is set by the D/A converter, the levels $V_{TELE}$ and $V_{WIDE}$ can be adjusted, so that the stop positions at the TELE and WIDE ends upon zooming can be easily finely adjusted, or the stop positions can be easily intentionally shifted.

The third embodiment of the present invention will be described below.

Figure 7:
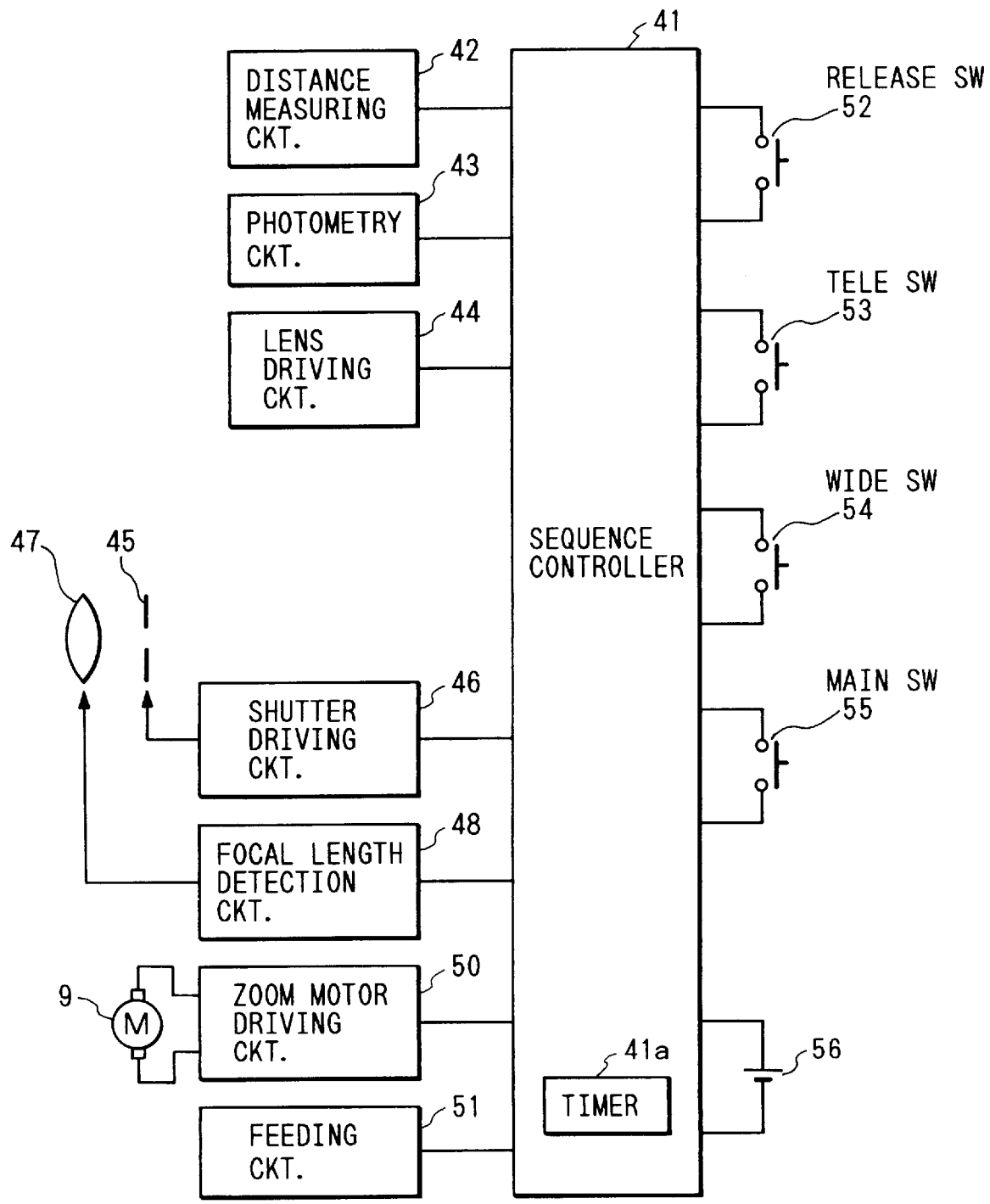
FIG. 7 is a block diagram showing the arrangement of principal part of a collapsible zoom camera according to the third embodiment of the present invention.

FIG. 7 shows the arrangement of principal part of a collapsible zoom camera comprising focal length detection means using a variable resistor. Referring to FIG. 7, the camera comprises a sequence controller 41 which controls the sequence of the entire camera, and has an internal timer 41a for counting various times. The camera also comprises a distance measuring circuit 42 which has a distance measuring sensor to measure the distance to an object, a photometry circuit 43 which has a photometry sensor to measure an object luminance, a lens driving circuit 44 for performing focusing upon reception of a lens driving amount calculated based on distance information measured by the distance measuring circuit 42, a shutter 45, a shutter driving circuit 46 for driving the shutter 45, and a photo-taking lens 47. The camera further comprises a focal length detection circuit 48 which uses a variable resistor to detect the focal length of the photo-taking lens 47, a zoom motor 49 for performing a zooming operation including a collapsing operation, a zoom motor driving circuit 50 for driving the zoom motor 49, a feeding circuit 51 for feeding a film, a release switch 52, a TELE switch 53 for instructing a zooming operation in the TELE direction, and a WIDE switch 54 for instructing a zooming operation in the WIDE direction. The camera also comprises a main switch 55. When the main switch 55 is turned on, the camera is set in a photo-taking standby state; when it is turned off, the camera is set in a collapsed state. A battery 56 serves as a power supply of the camera.

Figures 8, 9:
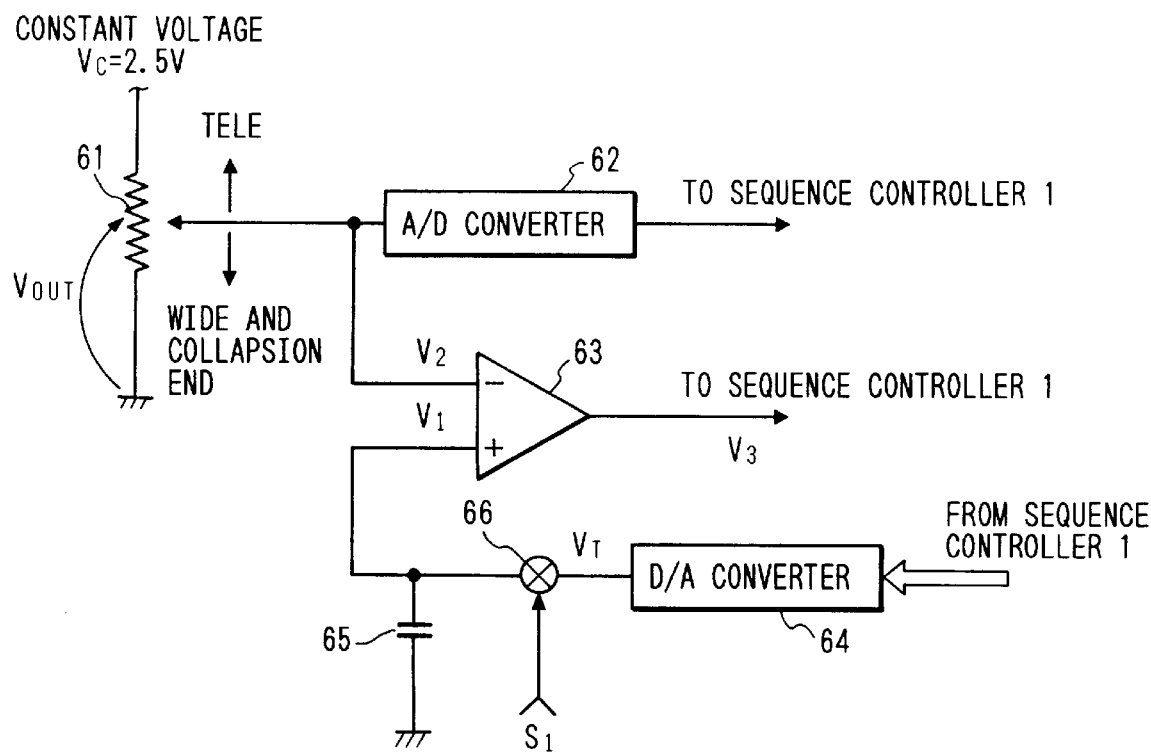
FIG. 8 is a circuit diagram showing the detailed arrangement of a focal length detection circuit shown in FIG. 7.
FIG. 9 is a table showing the relationship between the output level of the focal length detection circuit shown in FIG. 8 and the corresponding focal length.

FIG. 8 is a circuit diagram showing the arrangement of the focal length detection circuit 48.

Referring to FIG. 8, the focal length detection circuit 48 comprises a variable resistor 61, an A/D converter 62, and a comparator 63. In the variable resistor 61, the two terminals of the resistor are respectively connected to a constant voltage $V_C$ (=2.5 V) and GND, and the movable segment moves in synchronism with the zooming operation. Upon zooming in the TELE direction, the movable segment moves toward the $V_C$ side; and upon zooming in the WIDE direction, the movable segment moves toward the GND side. The A/D converter 62 A/D-converts a potential $V_{OUT}$ at the movable segment of the variable resistor 61 when the zooming is stopped. The comparator 63 receives, at its non-inverting input terminal, an input $V_1$ as a reference voltage level, and at its inverting input terminal, the output $V_{OUT}$ from the variable resistor 61 as an input $V_2$. The comparator 63 outputs the comparison result of these inputs as an output $V_3$. The focal length detection circuit 48 also comprises a D/A converter 64 for setting an analog output in accordance with a digital communication from the sequence controller 41, and a capacitor 65 for latching the analog output from the D/A converter 64 as the reference voltage $V_1$ for the comparator 63. Also, the circuit comprises an analog switch 66 which is turned on/off in response to a control signal $S_1$ from the sequence controller 41. The analog switch 66 has a function of controlling the connection/non-connection state between the analog output from the D/A converter 64 and the capacitor 65.

A digital output from the A/D converter 62 is input to the sequence controller for controlling various circuits of the camera, and thereafter, is classified into a plurality of zones to facilitate arithmetic processing.

FIG. 9 shows an example of the relationship between $V_{OUT}$ and the corresponding focal lengths when the number of zones is 15.

In this example, the camera has a focal length ranging from "35 mm to 105 mm", and divided zones are assigned in turn from the TELE end with numbers 1 to 15 called zoom positions (ZP).

Figure 10B:
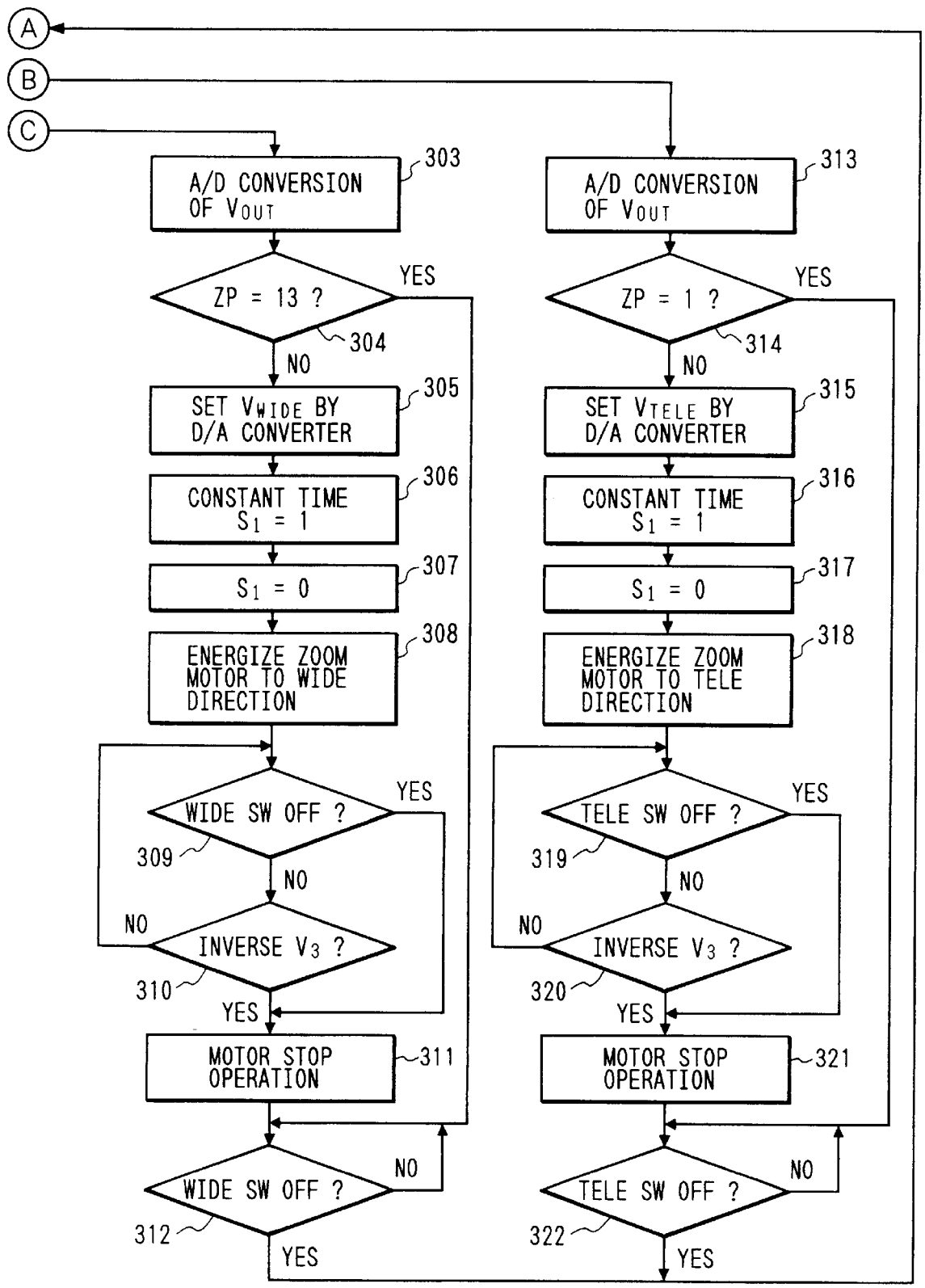
FIG. 10 is comprised of FIG. 10A and FIG. 10B showing flow charts of the operation of the principal part portion of the collapsible zoom camera according to the third embodiment of the present invention.

A sequence associated with the driving operations in the TELE and WIDE directions and the collapsing operation of the collapsible zoom camera with the above-mentioned arrangement will be described below with reference to the flow chart of the sequence controller 41 shown in FIG. 10A and FIG. 10B.

In an initial state, a lens barrel is located at a zooming position where a photo-taking operation is allowed, i.e., one of ZP=1 to 13, and the camera waits for the ON operation of the TELE switch 53 for performing a zooming operation in the TELE direction or the WIDE switch 54 for performing a zooming operation in the WIDE direction, or the OFF operation of the main switch 55. More specifically, in this state, the control repeats steps 301→302→323 . . . .

From this state, if it is determined in step 301 that the TELE switch 53 is ON, the flow advances from step 301 to step 313 to read the output from the A/D converter 62 for A/D-converting the output $V_{OUT}$ from the variable resistor 61, i.e., the zoom position from the focal length detection circuit 48. In step 314, it is checked if the read zoom position is "ZP=1 (TELE end)". If YES in step 314, the flow jumps to step 322 to wait for the OFF operation of the TELE switch 53. If YES in step 322, the control returns to the initial state.

On the other hand, if NO in step 314, the flow advances from step 314 to step 315. In step 315, the D/A converter 64 D/A-converts a value (2.4 V in FIG. 9) corresponding to $V_{OUT}$ at the boundary position between ZP=1 and ZP=2, and sets the D/A-converted value as an analog output $V_{TELE}$. In step 316, the control signal $S_1=1$ is set for a constant time, which is long enough to latch the analog output $V_{TELE}$ in the capacitor 65, thereby turning on the analog switch 66 in FIG. 8. When the constant time has elapsed, the flow advances to step 317 to set the control signal $S_1=0$, thereby turning off the analog switch 66 in FIG. 8. The flow then advances to step 318 to energize the zoom motor 49 in the TELE direction via the zoom motor driving circuit 50, thereby moving the zoom lens in the photo-taking lens 47 in the TELE direction. In step 319, it is checked if the TELE switch 53 is OFF. If NO in step 319, the flow advances to step 320 to check if the output $V_3$ from the comparator 63 in the focal length detection circuit 48 is inverted from the state before the zoom motor is energized in the TELE direction. If NO in step 320, the flow returns to step 319 to repeat the above-mentioned operation.

Thereafter, if it is determined in step 319 that the TELE switch 53 is turned off or if it is determined in step 320 that the output $V_3$ from the comparator 63 is inverted from a state before the zoom motor is energized in the TELE direction, the flow advances to step 321 to stop energization to the zoom motor 49. In step 322, the control waits for the OFF operation of the TELE switch 53. When YES in step 322, the control returns to the initial state.

From the initial state, if it is determined in step 302 that the WIDE switch 54 is ON, the flow advances from step 302 to step 303 to read the output from the A/D converter 62 for A/D-converting the output $V_{OUT}$ from the variable resistor 61, i.e., the zoom position from the focal length detection circuit 48. In step 304, it is checked if the read zoom position is "ZP=13 to 15 (the WIDE end to the collapse (collapsion) end position)". If YES in step 304, the flow jumps to step 312 to wait for the OFF operation of the WIDE switch 54. When YES in step 312, the control returns to the initial state.

On the other hand, if YES in step 304, the flow advances from step 304 to step 305. In step 305, the D/A converter 64 D/A-converts a value (0.8 V in FIG. 9) corresponding to $V_{OUT}$ at the boundary position between ZP=12 and ZP=13, and sets the D/A-converted value as an analog output voltage $V_{WIDE}$. In step 306, the control signal $S_1=1$ is set for a constant time, which is long enough to latch the analog output $V_{WIDE}$ in the capacitor 65, thereby turning on the analog switch 66 in FIG. 8. When the constant time has elapsed, the flow advances to step 307 to set the control signal $S_1=0$, thereby turning off the analog switch 66 in FIG. 8. The flow then advances to step 308 to energize the zoom motor 49 in the WIDE direction via the zoom motor driving circuit 50, thereby moving the zoom lens in the photo-taking lens 47 in the WIDE direction. In step 309, it is checked if the WIDE switch 54 is OFF. If NO in step 309, the flow advances to step 310 to check if the output $V_3$ from the comparator 63 in the focal length detection circuit 48 is inverted from the state before the zoom motor is energized in the WIDE direction. If NO in step 310, the flow returns to step 309 to repeat the above-mentioned operation.

Thereafter, it is determined in step 309 that the WIDE switch 54 is turned off or if it is determined in step 310 that the output $V_3$ from the comparator 63 is inverted from the state before the zoom motor is energized in the WIDE direction, the flow advances to step 311 to stop energization to the zoom motor 49. In step 312, the control waits for the OFF operation of the WIDE switch 54. If YES in step 312, the control returns to the initial state.

From the initial state, if it is determined in step 323 that the main switch 55 is turned off, the flow advances from step 323 to step 324. In step 324, the D/A converter 64 sets an analog output voltage $V_{K2}$ ("0.3 V" in this case) at a position offset from the collapse end position toward the WIDE end.

Figure 11:
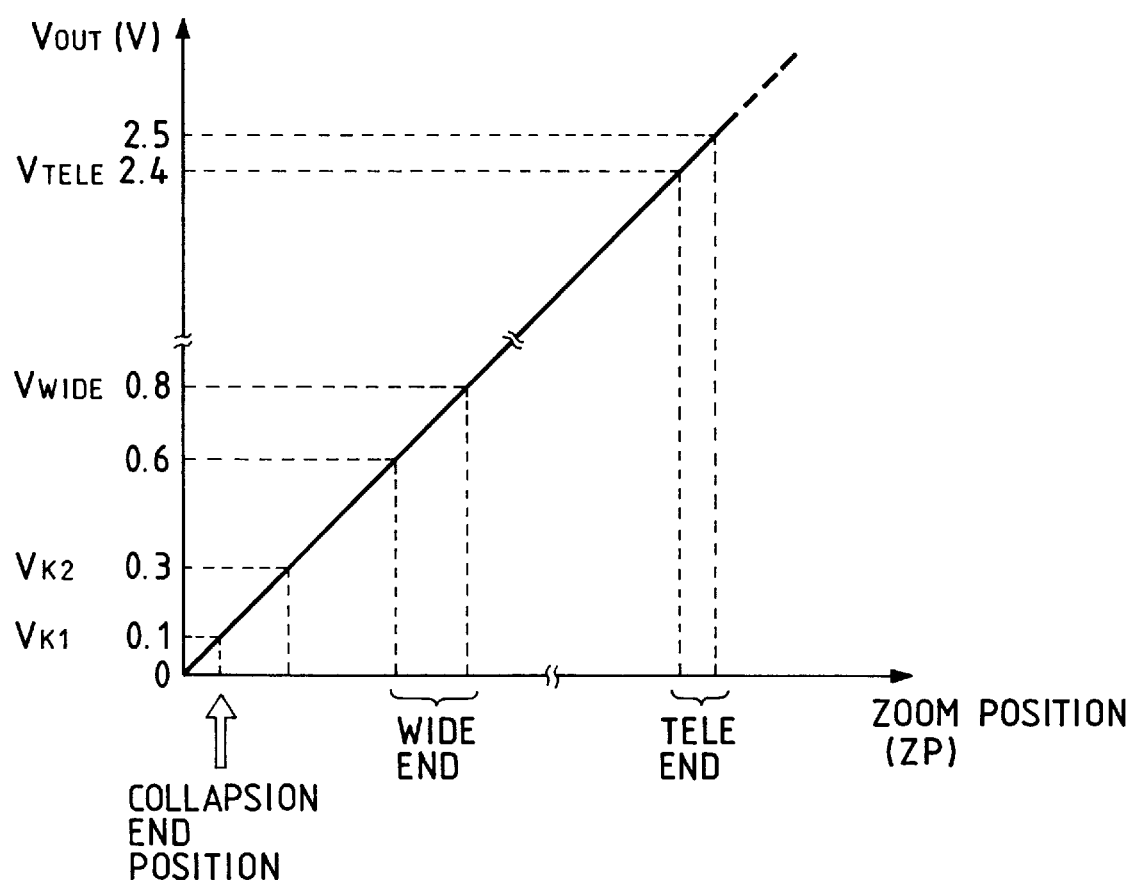
FIG. 11 is a graph showing the relationship among the zoom position, an output $V_{OUT}$ from a variable resistor, and various other voltages in the third and fourth embodiments of the present invention.

FIG. 11 shows the relationship among the analog output voltage $V_{K2}$, other voltages, and the zoom position.

An analog output voltage $V_{K1}$ is a value corresponding to the collapse end position, i.e., a position where the lens barrel is collapsed and stored in a camera main body, and is a value corresponding to a mechanical abutting position. In contrast to this, the analog output voltage $V_{K2}$ is a value present between $V_{K1}$ and $V_{WIDE}$.

Thereafter, the flow advances to step 325 to set the control signal $S_1=1$ for a constant time, which is long enough to latch the analog output voltage $V_{K2}$ in the latch 65, thereby turning on the analog switch 66 in FIG. 8. When the constant time has elapsed, the flow advances to step 326 to set the control signal $S_1=0$, thereby turning off the analog switch 66 in FIG. 8. The flow then advances to step 327 to energize the zoom motor 49 in the WIDE direction via the zoom motor driving circuit 50, thereby moving the zoom lens in the photo-taking lens 47 in the WIDE direction. In step 328, it is checked if the output $V_3$ from the comparator 63 in the focal length detection circuit 48 is inverted from a state before the zoom motor is energized in the WIDE direction. If NO in step 328, the control waits in this step.

Thereafter, when it is determined in step 328 that the output $V_3$ from the comparator 63 is inverted from a state before the zoom motor is energized in the WIDE direction, the flow advances to step 329 to start a delay timer $T_1$ corresponding a required zooming time from the position "$V_{OUT}=V_{K2}$" to the target collapse end position ($V_{OUT}=V_{K1}$). Upon completion of the count operation of the delay timer $T_1$, the flow advances to step 330 to stop energization to the zoom motor 49, thus ending the sequence at the zooming position where the photo-taking operation is allowed.

In the third embodiment, the reference voltage $V_{K2}$ of the comparator 63 in the collapsing operation is set to be a value present between $V_{K1}$ and $V_{WIDE}$. However, in a camera which requires only a short zooming time from the WIDE end to the collapse end position, "$V_{K2}=V_{WIDE}$" can be set. In this case, if the zooming position at the beginning of the collapsing operation corresponds to the WIDE end, since the output from the comparator 63 is not inverted, the motor energization and stop operations are controlled only by the delay timer from the beginning.

Figures 12, 12A:
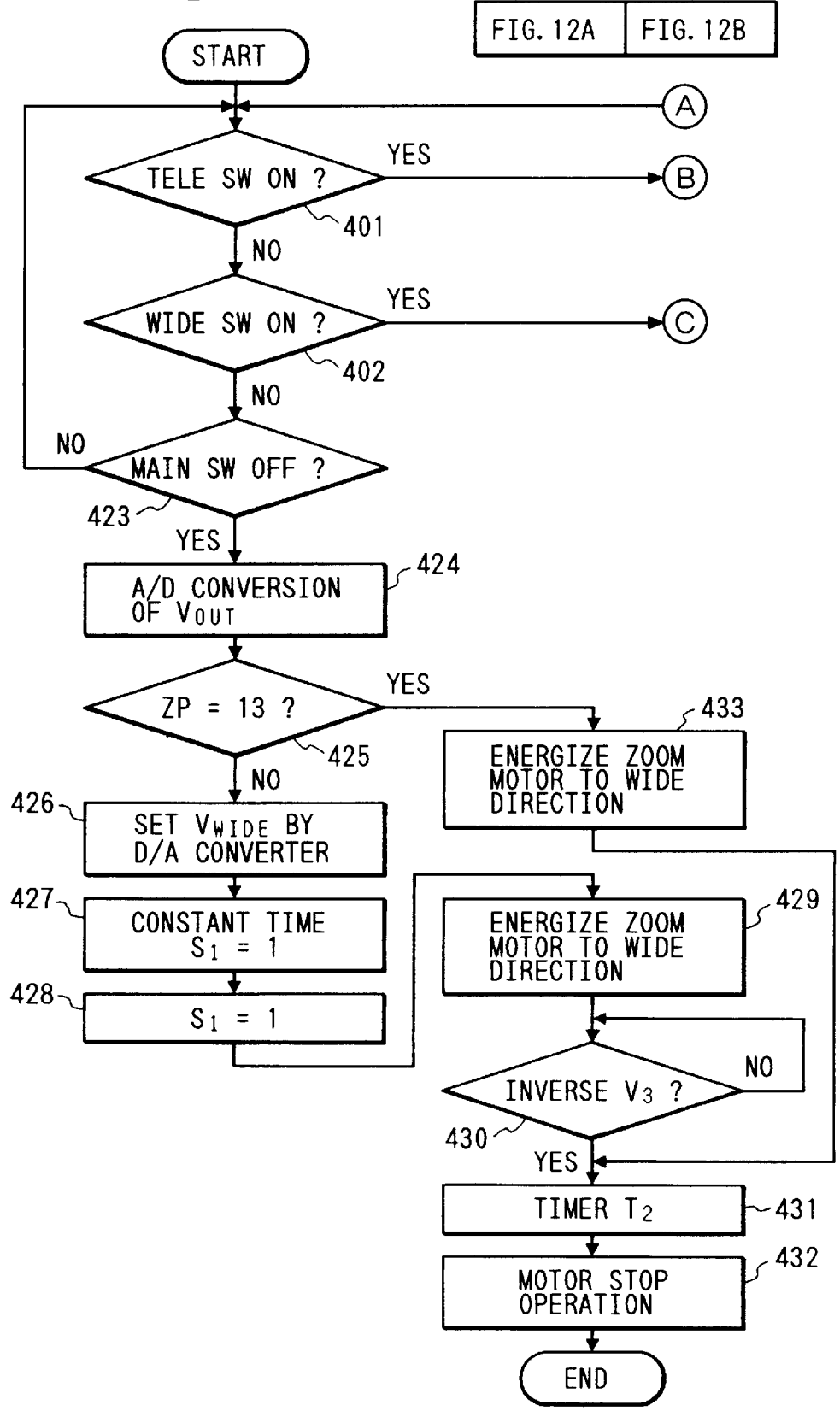
FIG. 12 is comprised of FIG. 12A and FIG. 12B showing flow charts of the operation of a principal part of a collapsible zoom camera according to the fourth embodiment of the present invention.
Figure 12B:
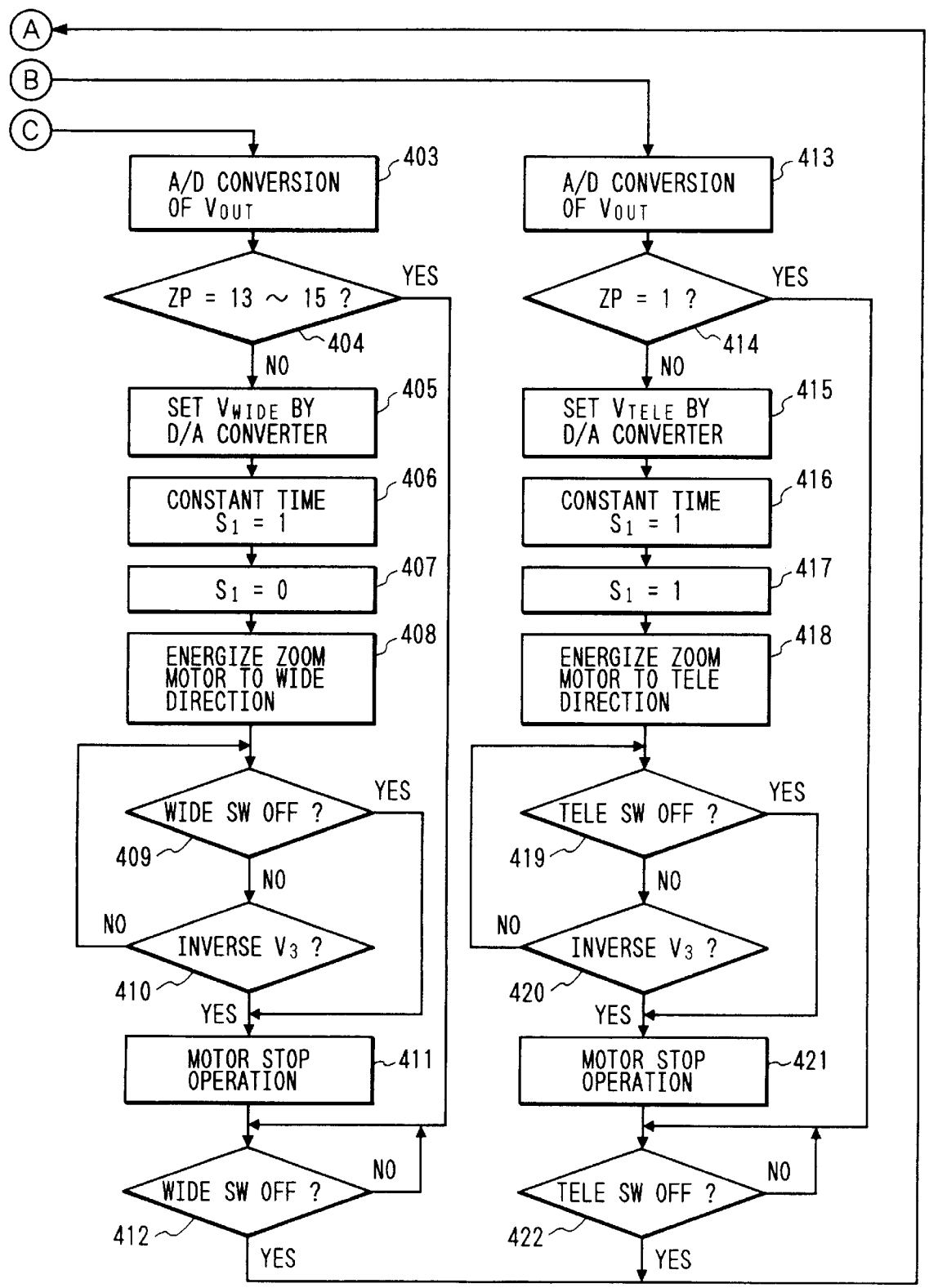

FIGS. 12A and 12B are flow charts of the sequence controller 41 according to the fourth embodiment of the present invention, which realizes the above-mentioned control.

Note that the arrangement of principal part of a collapsible zoom camera in the fourth embodiment is the same as that shown in FIG. 7, and the arrangement of the focal length detection circuit 48 and the relationship between the output $V_{OUT}$ from the variable resistor 61 and the corresponding focal length are respectively the same as those in FIGS. 8 and 9. For this reason, they will be quoted in the following description.

Since a driving operation in the TELE direction (steps 413 to 422) and a driving operation in the WIDE direction (steps 403 to 412) shown in FIG. 12B are the same as those in the above embodiment, only a collapsing operation (steps 423 to 430) shown in FIG. 12A will be explained below.

In an initial state, a lens barrel is located at a zooming position where a photo-taking operation is allowed, i.e., one of ZP=1 to 13, and the camera waits for the ON operation of the TELE switch 53 or the WIDE switch 54, or the OFF operation of the main switch 55. More specifically, in this state, the control repeats steps 401→402→423 . . . .

In the initial state, when the main switch 55 is turned off, the flow advances from step 423 to step 424, and the D/A converter 64 reads the output from the A/D converter 62 for A/D-converting the output $V_{OUT}$ from the variable resistor 61, i.e., the zoom position from the focal length detection circuit 48. In step 425, it is checked if the read zoom position is "ZP=13 (WIDE end)". As a result, if YES in step 425, the flow advances to step 433 to energize the zoom motor 49 in the WIDE direction via the zoom motor driving circuit 50, thereby moving the zoom lens in the photo-taking lens 47 in the WIDE direction. The flow then advances to step 431 to start a delay timer $T_2$ corresponding to a required zooming time from the WIDE end "$V_{OUT}=V_{WIDE}$" to the collapse end position ($V_{OUT}=V_{K1}$). Upon completion of the count operation of the delay timer $T_2$, the flow advances to step 432 to stop energization to the zoom motor 49, thus ending the sequence at the zooming position where the photo-taking operation is allowed.

On the other hand, if "ZP≠13", the flow advances from step 425 to step 426, the D/A converter 64 D/A-converts a value corresponding to $V_{OUT}$ at the WIDE end, and sets the D/A-converted value as the analog output voltage $V_{WIDE}$. In step 427, the control signal $S_1=1$ is set for a constant time, which is long enough to latch the analog output voltage $V_{WIDE}$ in the capacitor 65, thereby turning on the analog switch 66 in FIG. 8. When the constant time has elapsed, the flow advances to step 428 to set the control signal $S_1=0$, thereby turning off the analog switch 66 in FIG. 8. The flow then advances to step 429 to energize the zoom motor 49 in the WIDE direction via the zoom motor driving circuit 50, thereby moving the zoom lens in the photo-taking lens 47 in the WIDE direction. In step 430, it is checked if the output $V_3$ from the comparator 63 in the focal length detection circuit 48 is inverted from a state before the zoom motor is energized in the WIDE direction. If NO in step 430, the control waits in this step.

Thereafter, when it is determined in step 430 that the output $V_3$ from the comparator 63 is inverted from a state before the zoom motor is energized in the WIDE direction, the flow advances to step 431 to start the delay timer $T_2$ corresponding to a required zooming time from the WIDE end "$V_{OUT}=V_{WIDE}$" to the collapse end position ($V_{OUT}=V_{K1}$), as described above. Upon completion of the count operation of the delay timer $T_2$, the flow advances to step 432 to stop energization to the zoom motor 49, thus ending the sequence at the zooming position where the photo-taking operation is allowed.

According to each of the above embodiments, in the collapsing operation, the voltage level at a position offset from the target collapse end position toward the WIDE end is set as the reference voltage of the comparator 63, and after the output from the comparator 63 is inverted, the delay timer corresponding to the required zooming position from the above-mentioned position to the target collapse end position is started. Upon completion of the delay timer, the zooming stop operation is started. For this reason, even when the target collapse end stop position does not coincide with the actual lens barrel abutting position, the output from the comparator 63 is always obtained, and a disturbing phenomenon such as a zoom movement fault near the collapse end position can be prevented, thus assuring a stable collapsing operation.

More specifically, according to the above-mentioned fourth embodiment, a camera comprises timer means for measuring a constant time, and collapse end position control means for setting a voltage corresponding to an output voltage from a variable resistor at a position nearer a WIDE end position than a target collapse end position at the beginning of a collapsing operation as a reference voltage of a comparator, which voltage is to be compared with an output voltage from the variable resistor in correspondence with an actual zoom lens position, for starting the timer means when the output from the comparator is inverted, and for, when the timer means has measured the constant time, determining that the target collapse end position has been reached and stopping a driving operation of an actuator. During the collapsing operation, the actuator is driven on the basis of an output from position detection means up to a position nearer the WIDE end position (any position between the WIDE end and the collapse end or the WIDE end position) than the target collapse end position, and thereafter, the actuator is driven until the timer means measures the constant time, thereby executing position control of the lens barrel to the collapse end position.

For this reason, even when the collapse end position changes due to a change in photo-taking environment or a posture difference, since the comparator 63 can be surely inverted at collapse operation, a stable collapsing operation is always assured without giving a disturbing feeling to a user, damaging the lens barrel, or increasing cost.

The fifth embodiment of the present invention will be described below.

Figure 13:
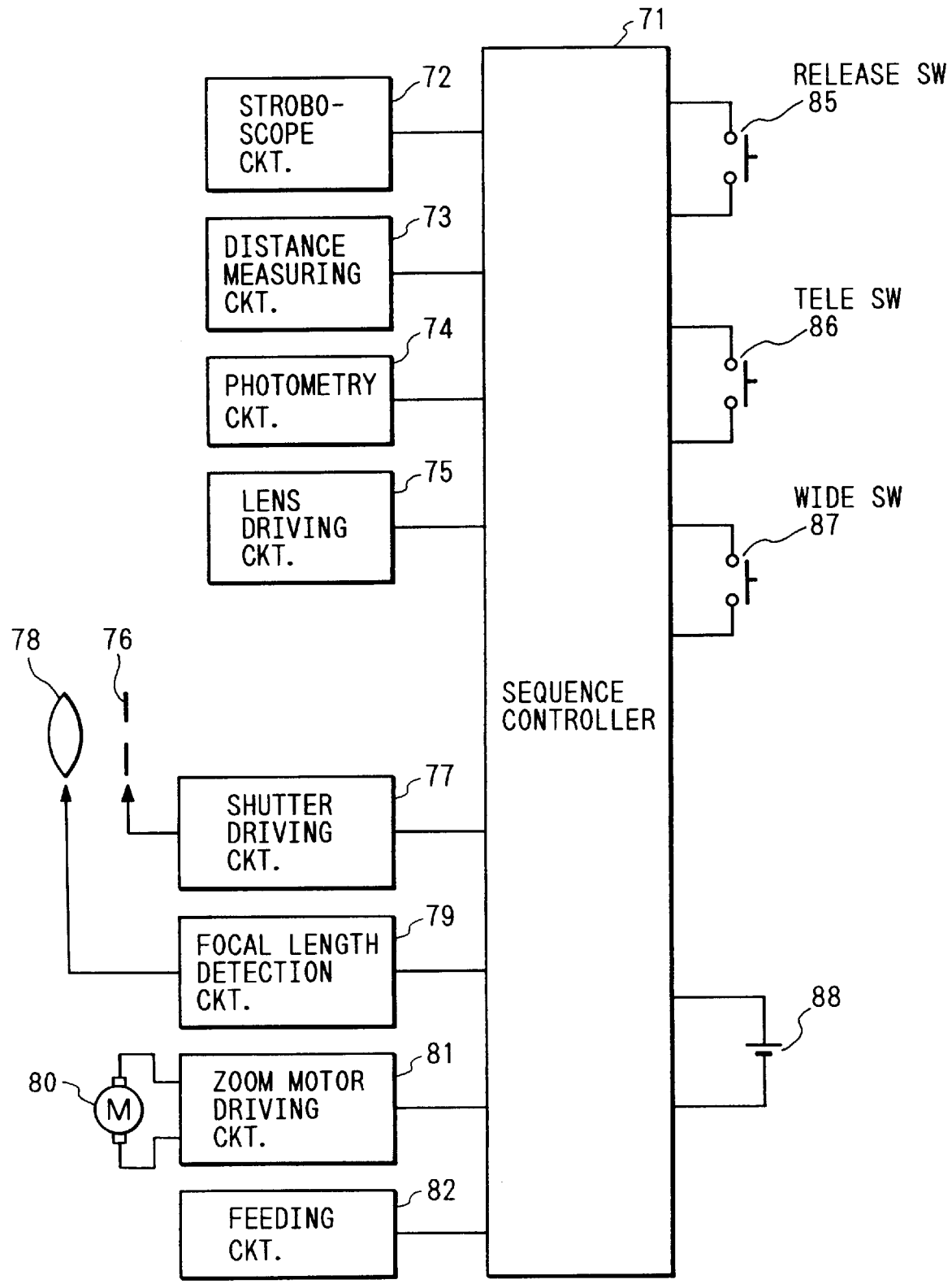
FIG. 13 Is a block diagram showing the arrangement of principal part of a zoom camera according to the fifth embodiment of the present invention.

FIG. 13 is a block diagram showing the arrangement of principal part of a zoom camera according to the fifth embodiment of the present invention.

Referring to FIG. 13, a camera comprises a sequence controller 71 for controlling the sequence of the entire camera, a stroboscope flash unit circuit 72 used in a stroboscope photo-taking mode, a distance measuring circuit 73 for measuring an object distance, a photometry circuit 74 for measuring an object luminance, a lens driving circuit 75 for performing focusing upon reception of a lens driving amount calculated based on distance information which is measured by the distance measuring circuit 73, a shutter 76, a shutter driving circuit 77 for driving the shutter 76, and a photo-taking lens 78.

The camera also comprises a focal length detection circuit 79 which uses a variable resistor to detect the focal length of the photo-taking lens 78. The focal length detection circuit 79 has the same arrangement as that in the above embodiment. A digital output from an A/D converter in the circuit 79 is input to the sequence controller 71, and thereafter, is classified into a plurality of zones to facilitate arithmetic processing, as shown in FIG. 3.

The camera further comprises a zoom motor 80 for performing zooming, a zoom motor driving circuit 81 for driving the zoom motor 80, a feeding circuit 82 for feeding a film, a release switch 85, a TELE switch 86, a WIDE switch 87, and a battery 88 for a camera, which battery serves as a common power supply of the above-mentioned circuits.

Figure 14:
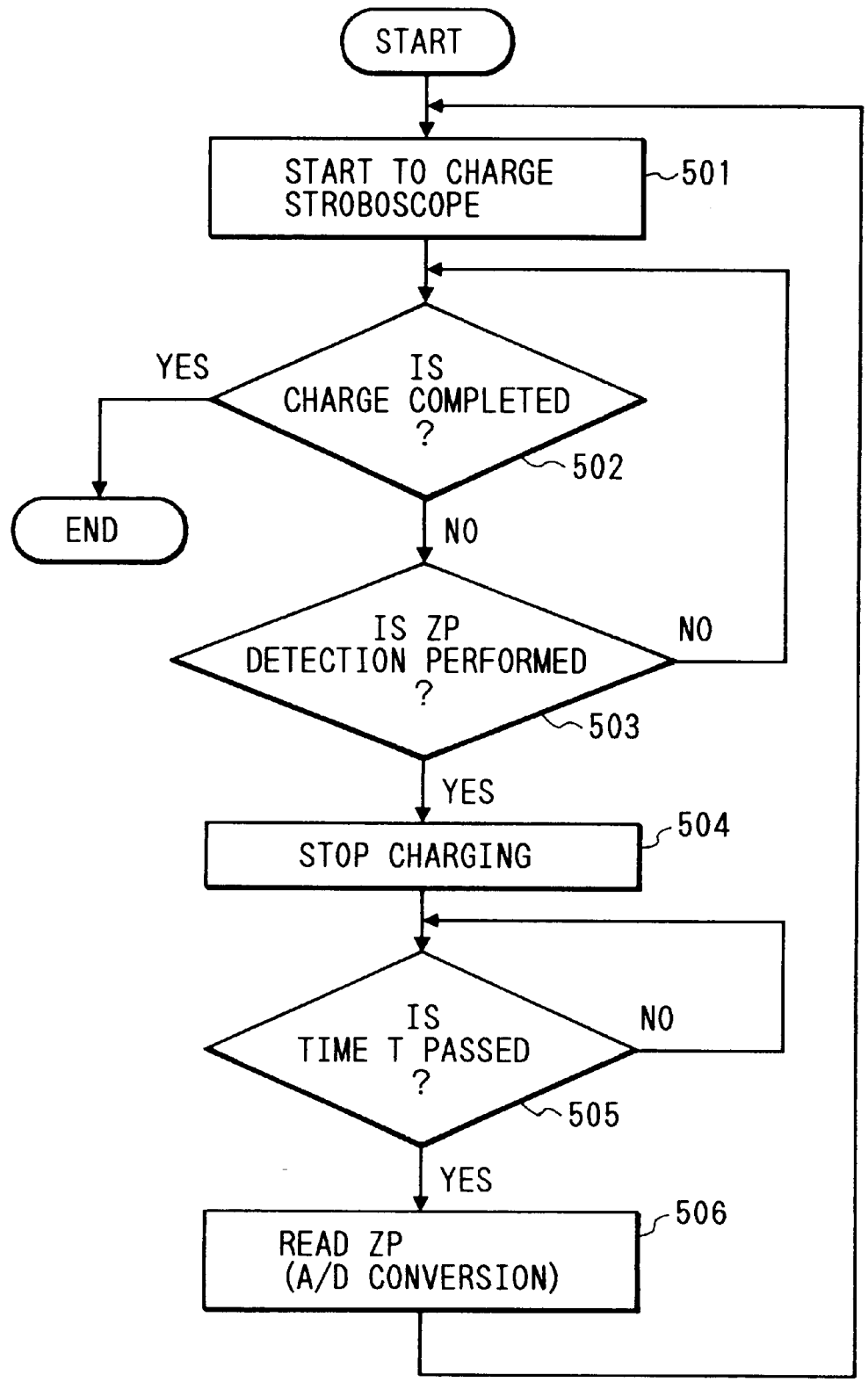
FIG. 14 is a flow chart showing the operation of the zoom camera shown in FIG. 13.

The operation of the zoom camera with the above-mentioned arrangement will be described below with reference to the flow chart of the sequence controller 71 shown in FIG. 14. Note that an initial state corresponds to a stroboscope non-charged state such as a state immediately after a stroboscope emission release operation.

In step 501, a stroboscope charging start signal is output to the stroboscope circuit 72 to start charging of a stroboscope. It is checked in step 502 if the charging end signal is input from the stroboscope circuit 72. If YES in step 502, the flow ends; otherwise, the flow advances to step 503 to check if the focal length of the zoom lens is required to be detected, i.e., the zoom position (ZP) is required to be detected for the purpose of the driving operations in the TELE and WIDE directions and the collapsing operation, as has been described in the above embodiment. If NO in step 503, the flow returns to step 502 to check if the charging operation of the stroboscope is completed.

On the other hand, if YES in step 503, the flow advances from step 503 to step 504, and a stroboscope charging stop signal is output to the stroboscope circuit 72, thereby stopping the charging operation of the stroboscope. In step 505, the control waits for an assurance time T in which the power supply voltage returns to a level capable of assuring linearity of the A/D converter in the focal length detection circuit 79. When the assurance time T has passed, the flow advances to step 506 to operate the focal length detection circuit 79 (A/D converter) to read the zoom position, i.e., to perform A/D conversion. Thereafter, the flow returns to step 501 again to start charging of the stroboscope.

Figure 15:
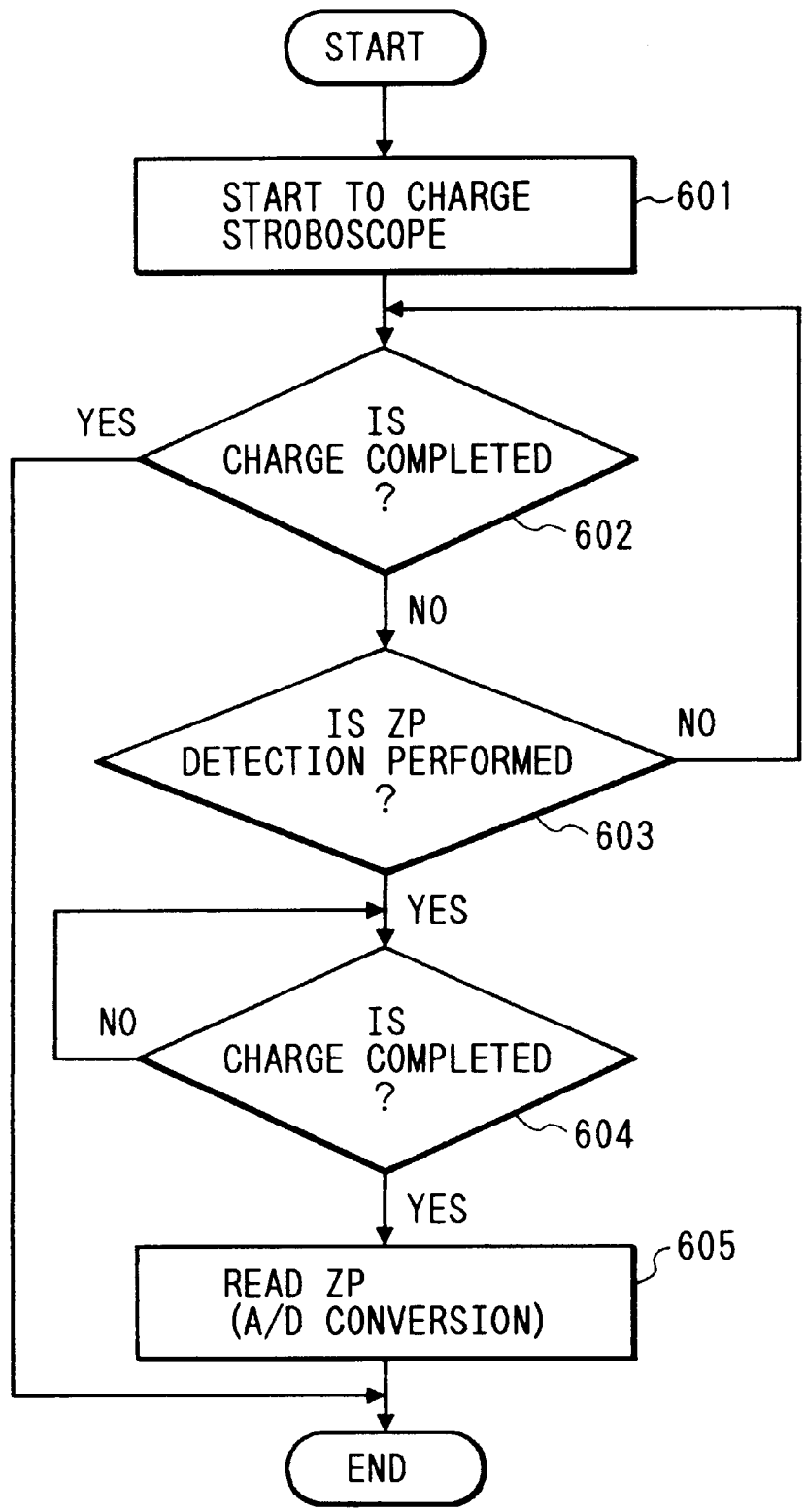
FIG. 15 is a flow chart showing the operation of a principal part of a zoom camera according to the sixth embodiment of the present invention.

In the fifth embodiment, when the zoom position is to be detected, the stroboscope charging operation is stopped. However, when detection of the zoom position can be postponed, it may be performed after the stroboscope charging operation is completed. The operation of the principal part portion of a zoom camera according to the sixth embodiment of the present invention for performing the above-mentioned control will be described below with reference to the flow chart of the sequence controller 71 shown in FIG. 15.

Since the circuit arrangement of the zoom camera for achieving the sixth embodiment is the same as that shown in FIG. 13, it will be quoted below.

In step 601, a stroboscope charging start signal is output to the stroboscope circuit 72 to start charging of a stroboscope. It is checked in step 602 if the charging end signal is input from the stroboscope circuit 72. If YES in step 602, the flow ends; otherwise, the flow advances to step 603 to check if the focal length of the zoom lens is required to be detected, i.e., the zoom position (ZP) is required to be detected. If NO in step 603, the flow returns to step 602 to check if the charging operation of the stroboscope is completed.

On the other hand, if YES in step 603, the flow advances from step 603 to step 604, and the control waits for a charging end signal input from the stroboscope circuit 72. Upon reception of the charging end signal, the flow advances to step 605 to operate the focal length detection circuit 79 (A/D converter) to read the zoom position, i.e., to perform A/D conversion, thus ending the operation.

Figure 16:
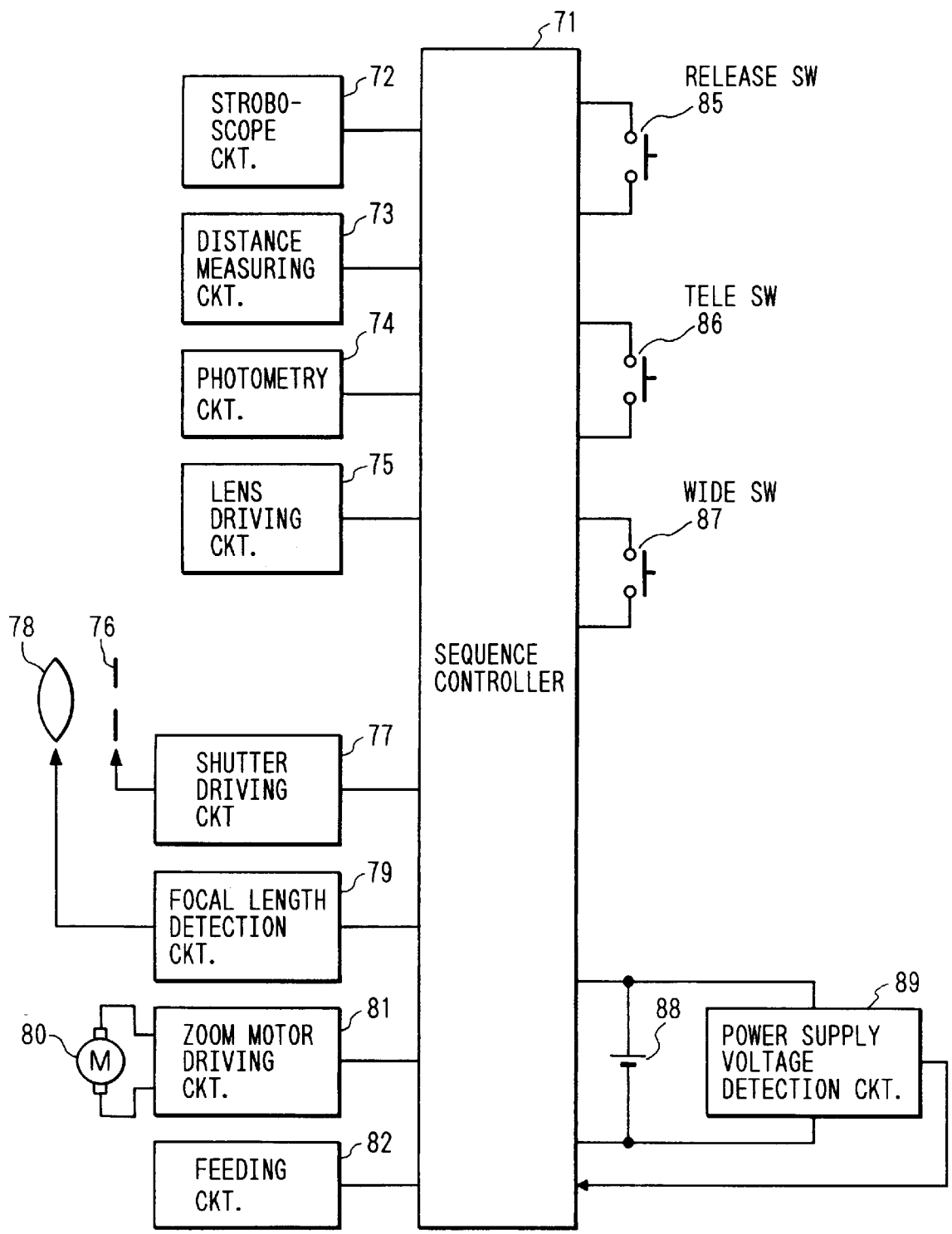
FIG. 16 is a block diagram showing the arrangement of principal part of a zoom camera according to the seventh embodiment of the present invention.

FIG. 16 is a block diagram showing the arrangement of principal part of a zoom camera according to the seventh embodiment of the present invention, and the same reference numerals in FIG. 16 denote the same parts as in FIG. 13.

Referring to FIG. 16, a power supply voltage detection circuit 89 comprises, e.g., a comparator, and detects whether or not the power supply voltage of the camera has returned to a level for assuring detection accuracy of an A/D converter in the focal length detection circuit.

In the seventh embodiment, when the charging operation of the stroboscope is being executed upon detection of the zoom position, detection of the zoom position can be performed without waiting for completion of the charging operation as long as the power supply voltage of the battery 78 is returned to a level for assuring the A/D conversion accuracy. For this reason, this discrimination is made based on the output from the power supply voltage detection circuit 89 to proceed to the following operation.

Figure 17:
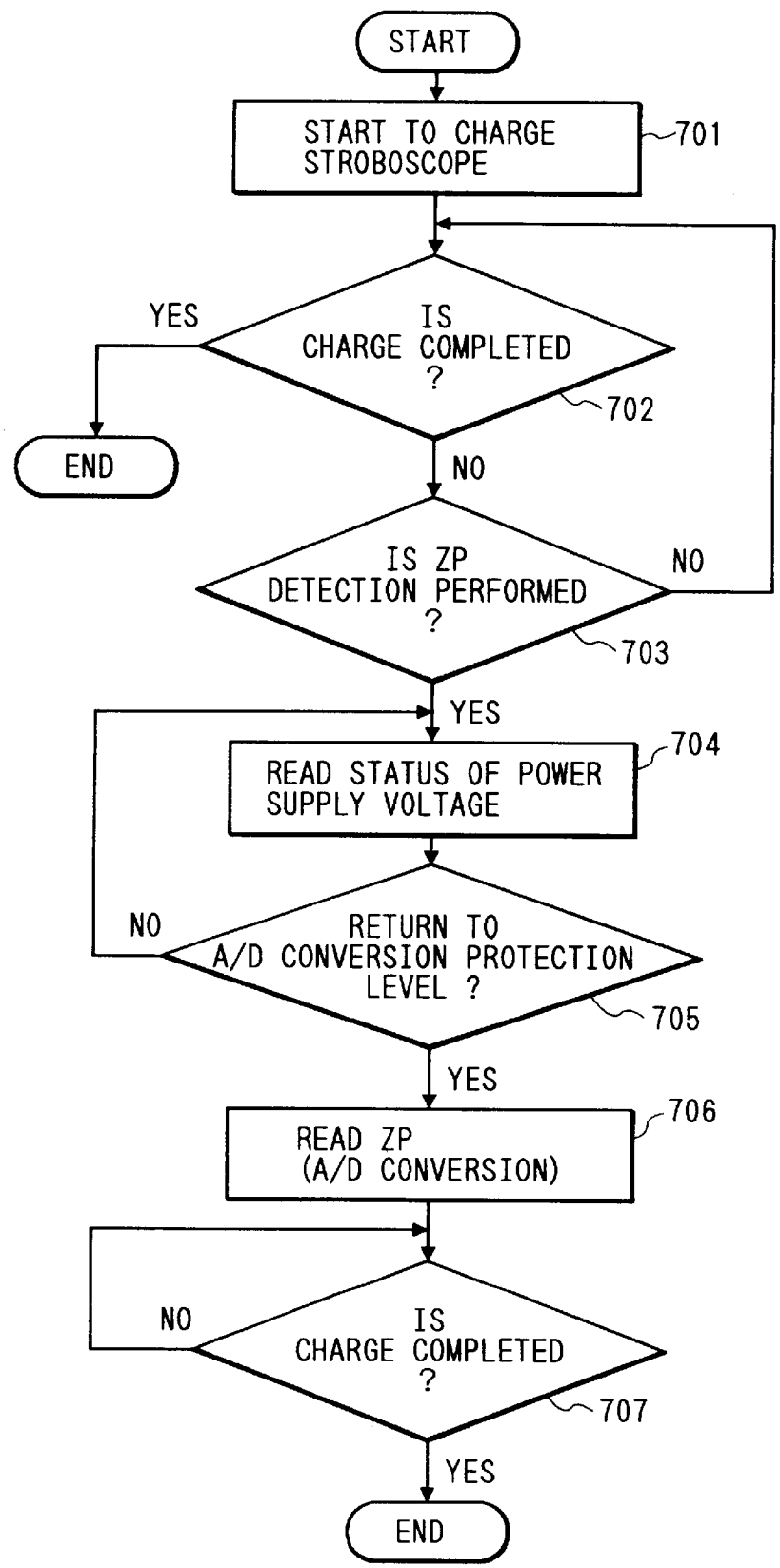
FIG. 17 is a flow chart showing the operation of the zoom camera shown in FIG. 16.

FIG. 17 is a flow chart showing the operation of the sequence controller 71 for realizing this control, and the operation will be described below with reference to FIG. 17.

In step 701, a stroboscope charging start signal is output to the stroboscope circuit 72 to start charging of a stroboscope. It is checked in step 702 if the charging end signal is input from the stroboscope circuit 72. If YES in step 702, the flow ends; otherwise, the flow advances to step 703 to check if the focal length of the zoom lens is required to be detected, i.e., the zoom position (ZP) is required to be detected. If NO in step 703, the flow returns to step 702 to check if the charging operation of the stroboscope is completed.

On the other hand, if YES in step 703, the flow advances from step 703 to step 704 to read the output from the power supply voltage detection circuit 89. In step 705, it is checked based on the read information (status of power supply voltage) if the power supply voltage has returned to the accuracy (linearity) assurance level of the A/D converter in the focal length detection circuit 79. If NO in step 705, the flow returns to step 704 to repeat the same loop. However, if YES in step 705, the flow advances to step 706 to operate the focal length detection circuit 79 (A/D converter) to read the zoom position, i.e., to perform A/D conversion. In step 707, the control waits for a charging end signal input from the stroboscope circuit 72, and when the charging end signal is received, the operation ends.

According to each of the fifth to seventh embodiments, when the focal length is to be detected, the stroboscope charging operation is inhibited (fifth embodiment), the detection of the focal length is performed after the charging operation of the stroboscope is completed (sixth embodiment), or the detection of the focal length is performed after the power supply voltage returns to the accuracy (linearity) assurance level of the A/D converter (seventh embodiment). For this reason, linearity of the A/D converter in the focal length detection circuit 79 can be assured, and focal length detection can always be normally performed.

More specifically, according to each of the fifth to seventh embodiments, the camera comprises control means for, when focal length detection means using an A/D converter detects a focal length, inhibiting a stroboscope charging operation by stroboscope means, control means for, when a stroboscope charging operation is being executed by stroboscope means upon detection of a focal length by focal length detection means, starting the focal length detection operation after the stroboscope charging operation is completed, or control means, when a stroboscope charging operation is being executed by stroboscope means upon detection of a focal length by focal length detection means, starting the focal length detection operation only when power supply voltage detection means detects that a power supply voltage has a level equal to or higher than a level for assuring A/D conversion accuracy of an A/D converter. When the focal length detection operation is to be performed, the stroboscope charging operation which causes a considerable power supply voltage drop is inhibited, the focal length detection operation and the stroboscope charging operation which causes a considerable power supply voltage drop are inhibited from being simultaneously performed, or the focal length detection operation is performed only when the power supply voltage which has dropped by the stroboscope charging operation returns to a level for assuring A/D conversion accuracy of the A/D converter.

Therefore, A/D conversion accuracy of the A/D converter upon detection of the focal length can be assured, and focal length detection can always be normally performed.

In each of the third and fourth embodiments, the output from the comparator is inverted at a position before the collapse end position. However, the present invention is not limited to the collapse end position, but may be applied to other accommodating end positions or other terminal end positions such as the TELE end.

In each of the fifth to seventh embodiments, A/D conversion accuracy for the stroboscope charging operation is assured. Alternatively, accuracy of the comparator described in each of the first to fourth embodiments may be assured for the stroboscope charging operation.

Also, the accuracy of the A/D conversion or the comparator may be similarly assured for other loads different from the stroboscope charging operation, e.g., a film feeding operation.

In each of the above embodiments, the lens stop position is discriminated before the lens is moved. However, the present invention is not limited to this. For example, the lens stop position may be discriminated after the lens is moved.

In each of the above embodiments, the stop position of the zoom lens is controlled. However, the present invention is not limited to this, but may be widely applied to control of the moving positions of other variable focal length lenses, single-focal length lenses, other optical systems, and objects other than an optical system such as a film feeding system.

According to the present invention, the above-mentioned embodiments or their technical elements may be combined as needed.

According to the present invention, the arrangement of the claims or embodiments may constitute a single apparatus as a whole, may be a device separated from or combined with other devices, or may be elements constituting an apparatus.

The present invention can be applied to a single-lens reflex camera, a lens-shutter camera, a video camera, optical equipment and the like other than cameras, devices applied thereto, or elements constituting them.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical apparatus comprising:
   (A) a signal output device which outputs an analog signal corresponding to a position of an operation member; and
   (B) a determination device which determines the position of the operation member in accordance with at least first and second determinations, in said first determination said determination device determining the position of the operation member during movement of the operation member by comparing the analog signal of said signal output device with a plurality of predetermined values, in said second determination said determination device determining the position of the operation member after the operation member has stopped by using a manner different from a manner of said first determination.

2. An optical apparatus according to claim 1, wherein the operation member comprises an optical member.

3. An optical apparatus according to claim 1, wherein the operation member comprises a photo-taking lens.

4. An optical apparatus according to claim 1, wherein the operation member comprises a variable focal length optical member.

5. An optical apparatus according to claim 1, wherein the operation member comprises a zoom optical member.

6. An optical apparatus according to claim 1, wherein said signal output device comprises a variable resistor whose resistance changes in accordance with the moving position of the operation member.

7. An optical apparatus according to claim 1, wherein said determination device comprises means for converting the analog signal output from said signal output device into a digital signal in said first determination.

8. An optical apparatus according to claim 1, further comprising:
   a motor for driving the operation member.

9. An optical apparatus according to claim 1, wherein said determination device comprises an adjuster for adjusting the predetermined value.

10. An optical apparatus according to claim 1, further comprising:
    a moving device which moves the operation member, said moving device stopping the operation device in response to said first determination of said determination device.

11. An optical apparatus according to claim 1, further comprising:
    a moving device which moves the operation member, said moving device stopping the operation device in response to said first determination of said determination device when the operation device has reached a predetermined position.

12. An optical apparatus according to claim 1, wherein said optical apparatus comprises a camera.

13. An optical apparatus comprising:
    (A) a signal output device which outputs an analog signal corresponding to a moving position of an operation member
    (B) a determination device which determines the position of the operation member by comparing the analog signal of said output device with a plurality of predetermined values; and
    (C) a moving device which moves the operation member, said moving device stopping the operation member in response to determination of said determination device, wherein said determination device determines a position for stopping the operation member before the operation member reaches a stop target position of the operation member.

14. An optical apparatus according to claim 13, wherein said determination device comprises an adjuster for adjusting the predetermined value.

15. An optical apparatus according to claim 13, wherein said determination device comprises means for stopping the operation member for a predetermined time period later after determining the position for stopping the operation member.

16. An optical apparatus according to claim 13, wherein said optical apparatus comprises a camera.

17. An optical apparatus comprising:
    (A) a signal output device which outputs an analog signal corresponding to a position of an operation member; and (B) a determination device which determines the position of the operation member in accordance with at least first and second determinations, in said first determination said determination device determining the position of said operation member by comparing the analog signal of said signal output device with a plurality of predetermined values, in said second determination said determination device determining the position of said operation member by converting the analog signal of said signal output device into a digital signal, said determination device restricting simultaneously performing of said converting and an operation of another load.

18. An optical apparatus according to claim 17, wherein said operation of another load comprises a charging operation of a flash unit.

19. An optical apparatus according to claim 18, wherein said determination device comprises means for preferentially executing said correcting to the charging operation of the flash unit.

20. An optical apparatus according to claim 18, wherein said determination device comprises means for preferentially executing the charging operation of the flash unit to said converting.

21. An optical apparatus according to claim 18, wherein said determination device comprises means for restricting simultaneously performing of said converting and said operation of another load while a power supply is not in a predetermined state.

22. An optical apparatus according to claim 17, wherein said determination device is arranged to be operated by a power supply for said operation of another load.

23. An optical apparatus according to claim 17, wherein said optical apparatus comprises a camera.

24. An apparatus comprising:

(a) signal output means for outputting a signal corresponding to a moving position of an optical system by a variable resistor varying a resistance value in response to a movement of said optical system;

(b) an A/D convertor for performing an A/D conversion of the signal from said signal output means;

(c) a comparator which is set to invert an output from the signal of said signal output means when said optical system has reached a predetermined position during the movement of said optical system; and (d) determination means which performs a first determination for determining that said optical system has reached said predetermined position during the movement of said optical system by the output of said comparator regardless of the output of said A/D convertor, and a second determination for determining the position of said optical system finer than the position determination of said first determination by the output of said A/D convertor when said optical system is stopping.

25. An apparatus according to claim 24, wherein said signal output means outputs a signal corresponding to a focal distance variable position of said optical system.

26. An apparatus according to claim 24, wherein said apparatus includes an optical device.

27. An apparatus according to claim 24, wherein said apparatus includes a camera.

28. A position determining apparatus comprising:

(a) signal output means for outputting a signal corresponding to a moving position of an optical system by a variable resistor varying a resistance value in response to a movement of said optical system;

(b) an A/D convertor for performing an A/D conversion of the signal from said signal output means;

(c) a comparator which is set to invert an output from the signal of said signal output means when said optical system has reached a predetermined position before said optical system reaches a predetermined target stop position during the movement of said optical system; and (d) determination means which performs a first determination for stopping the movement of said optical system in accordance with a determination that said optical system has reached said predetermined position during the movement of said optical system by the output of said comparator regardless of the output of said A/D convertor, and a second determination for determining the position of said optical system finer than the position determination of said first determination by the output of said A/D convertor when said optical system is stopping.

29. An apparatus according to claim 28, wherein said signal output means outputs a signal corresponding to a focal distance variable position of said optical system.

30. An apparatus according to claim 28, wherein said apparatus includes an optical device.

31. An apparatus according to claim 28, wherein said apparatus includes a camera.

* * * * *

UNITED STATES PATENT AND TRADEMARK OFFICE
CERTIFICATE OF CORRECTION

PATENT NO. : 5,956,532
DATED : September 21, 1999
INVENTOR(S) : Hiroshi Arita

It is certified that error appears in the above-identified patent and that said Letters Patent are hereby corrected as shown below:

Col. 2, line 43, delete "Is" and insert -- is --.
Col. 16, line 42, after "member" insert --; --.

Signed and Sealed this

Third Day of April, 2001

Attest:

NICHOLAS P. GODICI

Attesting Officer     Acting Director of the United States Patent and Trademark Office